US012344027B2

(12) United States Patent
Smit

(10) Patent No.: US 12,344,027 B2
(45) Date of Patent: Jul. 1, 2025

(54) WOODWORKING CIRCLE-DRAWING TOOL

(71) Applicant: Ryan Alexander Smit, Honolulu, HI (US)

(72) Inventor: Ryan Alexander Smit, Honolulu, HI (US)

( * ) Notice: Subject to any disclaimer, the term of this patent is extended or adjusted under 35 U.S.C. 154(b) by 411 days.

(21) Appl. No.: 18/148,165

(22) Filed: Dec. 29, 2022

(65) Prior Publication Data

US 2023/0147660 A1 May 11, 2023

Related U.S. Application Data

(63) Continuation-in-part of application No. 29/757,908, filed on Nov. 10, 2020, now Pat. No. Des. 1,016,909.

(51) Int. Cl.
*B43L 9/04* (2006.01)

(52) U.S. Cl.
CPC .................................... *B43L 9/04* (2013.01)

(58) Field of Classification Search
CPC ........................................................ B43L 9/04
See application file for complete search history.

(56) References Cited

U.S. PATENT DOCUMENTS 1,460,093 A 6/1923 Costovici
2,156,417 A * 5/1939 Witherspoon .......... B43L 11/04 33/31
2,162,568 A * 6/1939 Ackron .................... B43L 9/04 33/27.01
4,044,464 A * 8/1977 Schiess ..................... B43L 9/04 30/310
4,794,699 A * 1/1989 Perna ....................... B25H 7/04 33/27.03
6,223,443 B1 * 5/2001 Jacobs ...................... B43L 9/04 33/760

(Continued)

FOREIGN PATENT DOCUMENTS

CN 203542216 U * 4/2014
DE 202016102180 U1 * 6/2016

OTHER PUBLICATIONS

How to Draw Axe Throwing Targets, retrieved from the internet, retrieved on Dec. 29, 2022; <URL: https://worldaxethrowingleague.com/how-to-draw-axe-throwing-targets/>.

(Continued)

*Primary Examiner* — Yaritza Guadalupe-McCall

(57) ABSTRACT

A woodworking circle-drawing tool is an apparatus that enables the user to draw precise circles for an axe throwing target. The apparatus includes a support bar, a releasable anchor, a marker holder, a holder clamp, and a small-target stencil. The support bar serves to support the operation of the releasable anchor, the marker holder, and the small-target stencil. The support bar also serves to keep the marker holder at different distances from the releasable anchor to draw the different sized circles. The releasable anchor serves to secure the apparatus to the target board using an appropriate fastener. The holder clamp enables the secure attachment of the marker holder to the support bar. The marker holder enables the attachment of a marker that can be used to draw the target circles using the apparatus. The small-target stencil enables the drawing of smaller circles often found in axe throwing targets.

20 Claims, 26 Drawing Sheets

(56) References Cited

U.S. PATENT DOCUMENTS

| | | | | |
|---|---|---|---|---|
| 6,907,669 | B1 * | 6/2005 | Han | B43K 29/001 33/27.03 |
| D1,016,909 | S * | 3/2024 | Smit | D19/37 |
| 2009/0151175 | A1 * | 6/2009 | Chen Lin | B43L 9/04 33/30.4 |
| 2010/0000102 | A1 * | 1/2010 | Contreras | B43L 9/24 33/27.03 |
| 2022/0236044 | A1 * | 7/2022 | Sanchez | G01B 3/166 |
| 2023/0147660 | A1 * | 5/2023 | Smit | B43L 9/04 33/27.03 |

OTHER PUBLICATIONS

Axe Throwing Target Stencil—3 Ring NATF Axe League Style, retrieved from the internet, retrieved on Dec. 29, 2022; <URL: https://guyana.desertcart.com/products/112921223-axe-throwing-target-stencil-3-ring-natf-axe-league-style>.

How to Draw Axe Throwing Targets, retrieved from the internet, retrieved on Dec. 29, 2922; <URL: https://www.youtube.com/watch?v=zdv8tGXokY8>.

Axe throwing target stencil, stencil only no wood!, retrieved from the internet, retrieved on Dec. 29, 2022; <URL: https://www.etsy.com/listing/727502444/axe-throwing-target-stencil-stencil-only>.

* cited by examiner

WOODWORKING CIRCLE-DRAWING TOOL

The current application is a continuation-in-part (CIP) application of the U.S. design application Ser. No. 29/757,908 filed on Nov. 10, 2020.

FIELD OF THE INVENTION

The present invention relates generally to stencils for drawing precise figures on various materials. More specifically, the present invention provides a stencil to draw target circles on a wooden axe throwing board.

BACKGROUND OF THE INVENTION

Stencils for drawing target circles on a wooden axe throwing board exist in the industry. These stencils allow users to draw neat target circles quickly. To draw a target circle using an existing stencil, the user fastens the stencil, usually made of metal, to the center of the wooden axe throwing board. Then, the user puts a marker into a maker hole of the stencil and rotates the stencil about the pivot point. A downside of the currently available stencils is that oftentimes, the user is not sure how deep should the stencil be screwed onto the wooden axe throwing board. If the stencil is loosely screwed, the stencil would be rocking and not allowing the user to draw perfect circles. If the stencil is too tightly screwed, the stencil would be hard to rotate about the pivot point. In addition, the user would have to pull out the marker from the stencil each time when drawing different sized target circles. Due to the repetitive process of reattaching the marker, the pivot point can be tilted and cause the user to make unwanted marks accidentally on the wooden axe throwing board. Therefore, there is a need for a more accurate tool that enables the drawing of several circles without the unfastening of the stencil or the removal of the marker.

An objective of the present invention is to provide a woodworking circle-drawing tool that enables the drawing of several target circles on a wooden axe throwing board. The present invention allows the user to precisely draw several target circles single-handedly. Another objective of the present invention is to provide a woodworking circle-drawing tool that does not require the unfastening of different parts to draw the different sized circles. The present invention does not require the unfastening of the marker from the stencil each time when drawing the different sized circles. This way, the user can draw several target circles single-handedly and consecutively. Additional features and benefits are further discussed in the sections below.

SUMMARY OF THE INVENTION

The present invention is a woodworking circle-drawing tool that is specifically designed to draw an axe throwing target on wood or similar materials. The present invention can be manufactured to specifications of major axe throwing leagues, and possibly other leagues for throwing objects at a target competitively. In the preferred embodiment, the present invention includes a releasable anchor with a center-slotted screw fastener designed to be attached into the center point of the desired target object. Further, a support bar fits into the releasable anchor that supports a marker holder that can be moved along the support bar. The marker holder can be moved closer or farther from the releasable anchor at specific locking intervals to draw the different target circles without having to remove the marker from the marker holder.

Further, unlike traditional target stencils which are generally flat with holes at certain intervals for a marker to be inserted into, a marker perfectly first into the marker holder of the present invention which has a tubular jacket. The tubular jacket allows the marker holder to spin freely while being secured to the support bar. This way, the user can hold onto the marker holder and move the marker around the target board in a circle to draw the target circle. The user can easily maintain the orientation of that marker in relation to the center of the circle for a perfect even line for each of the different target circles. Furthermore, the present invention includes additional accessories that enhance the operation of the present invention.

DETAIL DESCRIPTIONS OF THE INVENTION

Figure 1:
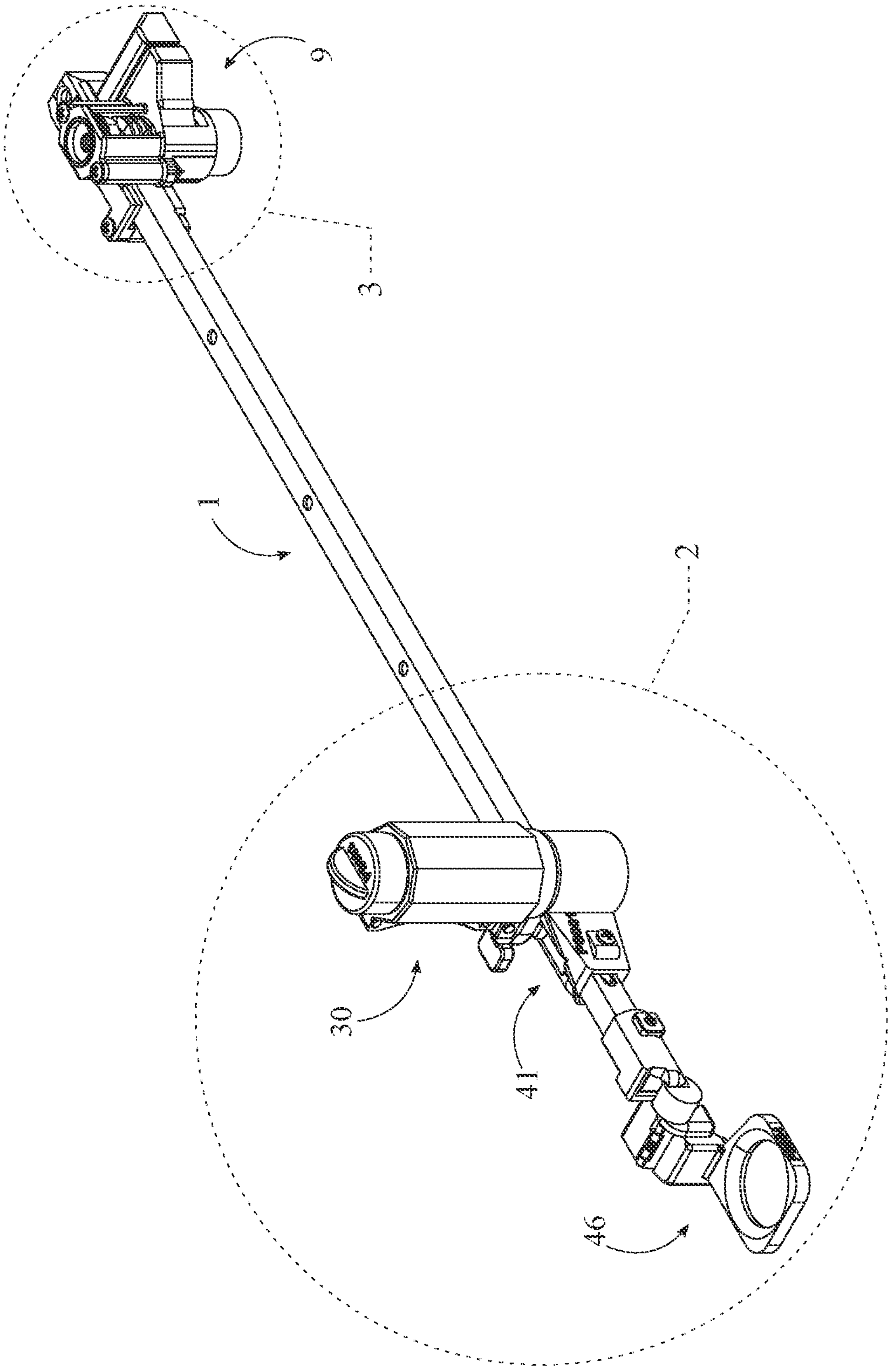
FIG. 1 is a top-front-left perspective view of the present invention.
Figure 2:
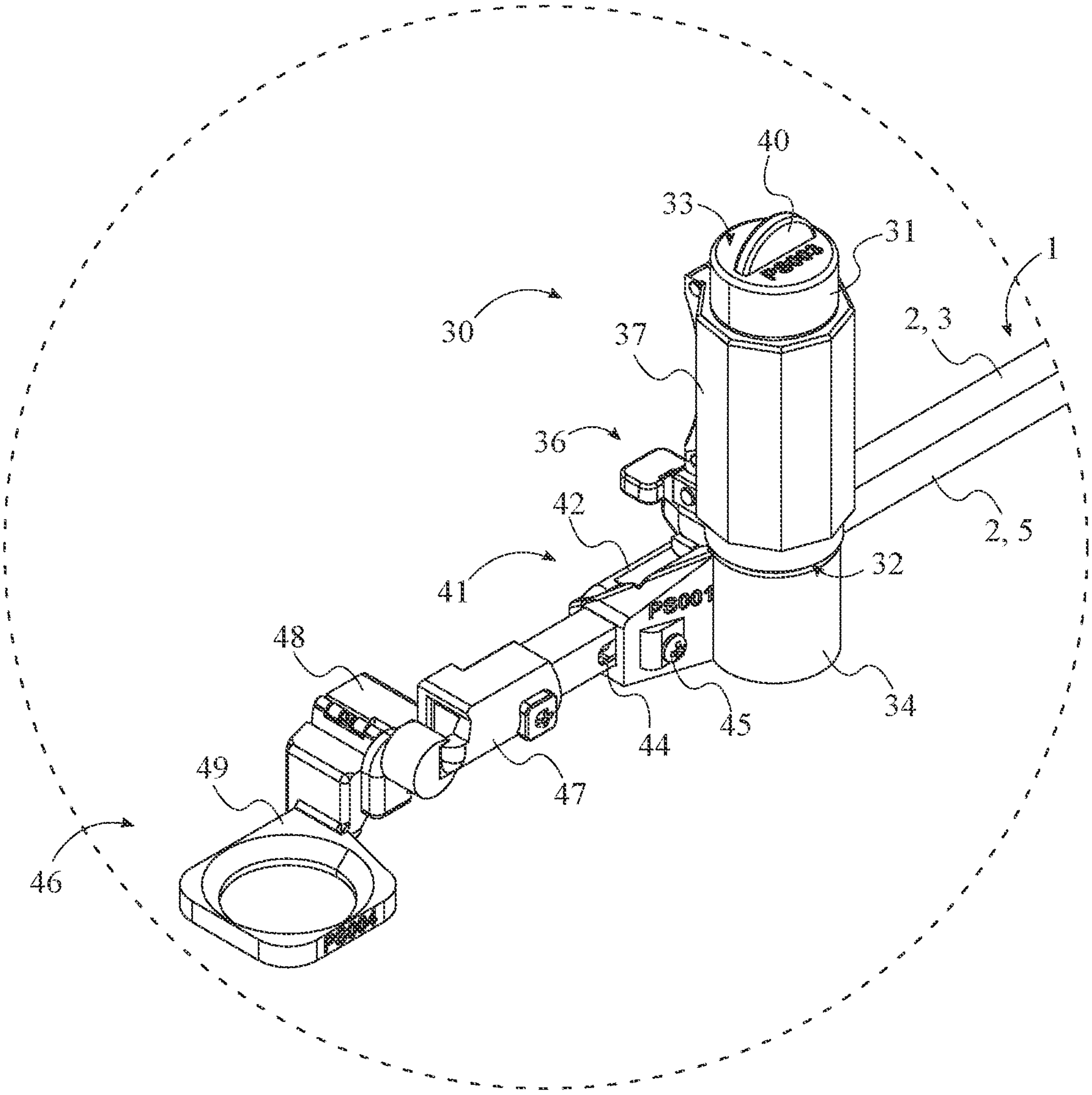
FIG. 2 is a magnified view of the marker holder, the holder clamp, the small-target stencil, and the support bar of the present invention shown in FIG. 1.
Figure 3:
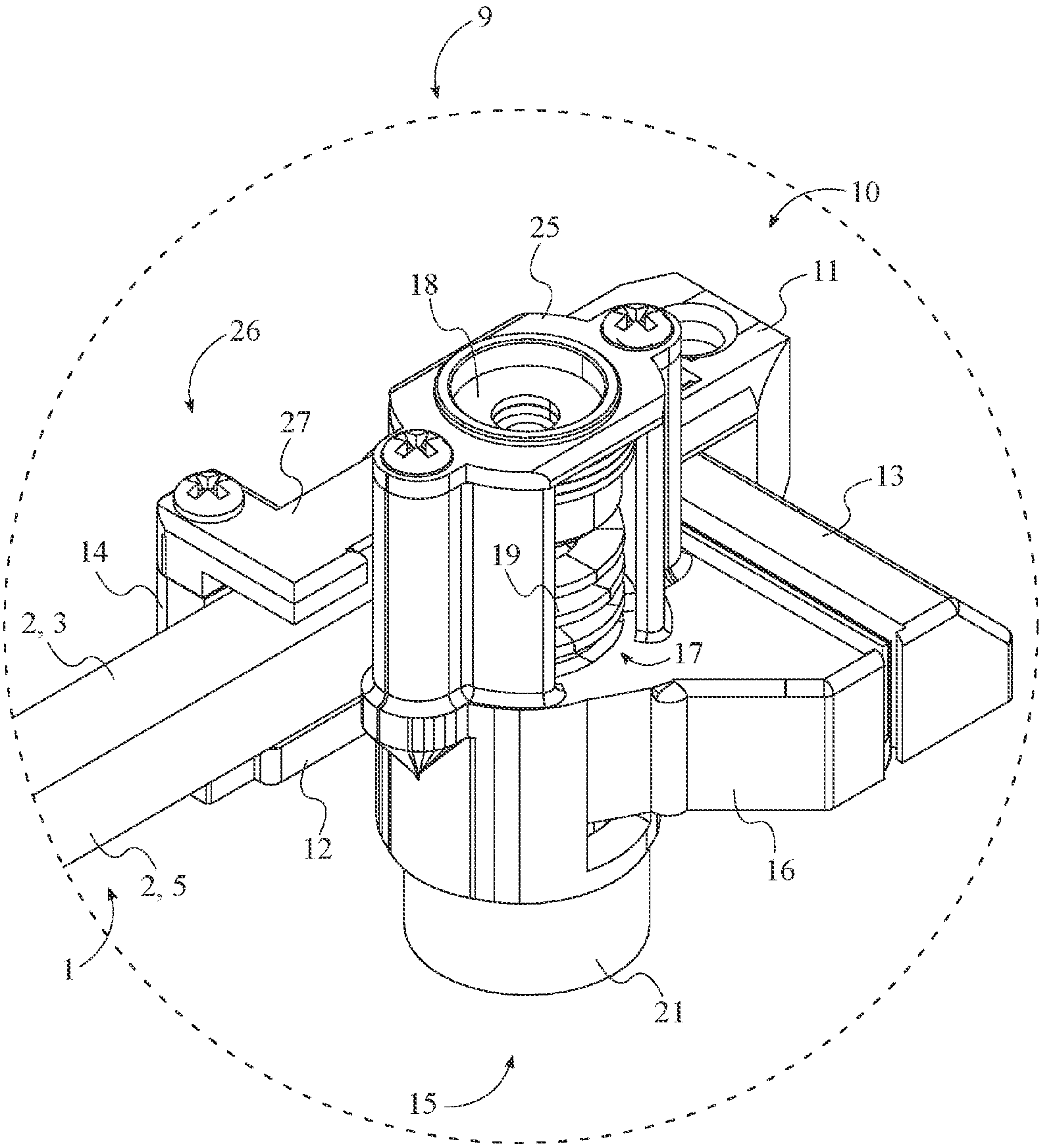
FIG. 3 is a magnified view of the releasable anchor and the support bar of the present invention shown in FIG. 1.
Figure 4:
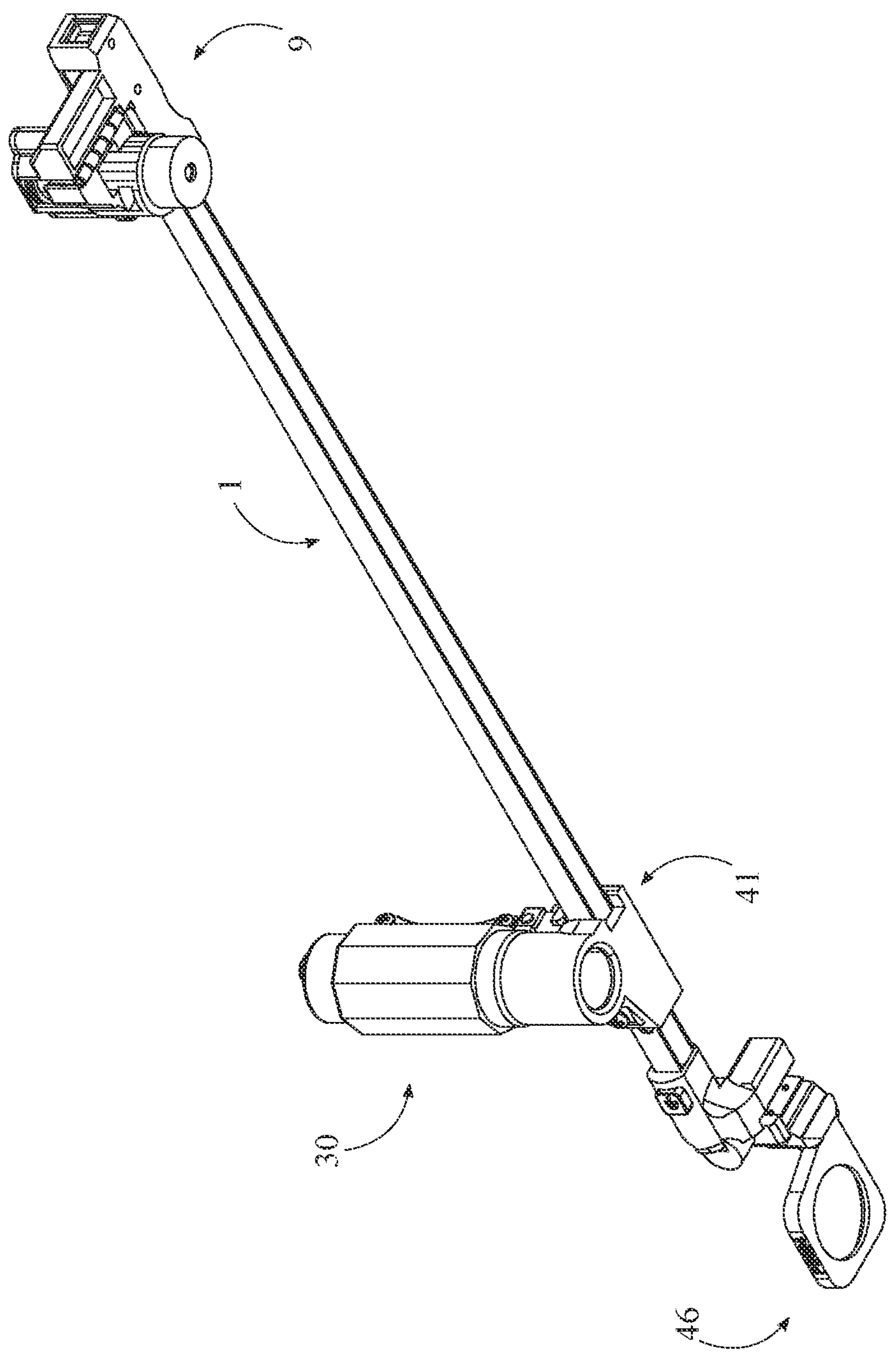
FIG. 4 is a bottom-rear-left perspective view of the present invention.
Figure 5:
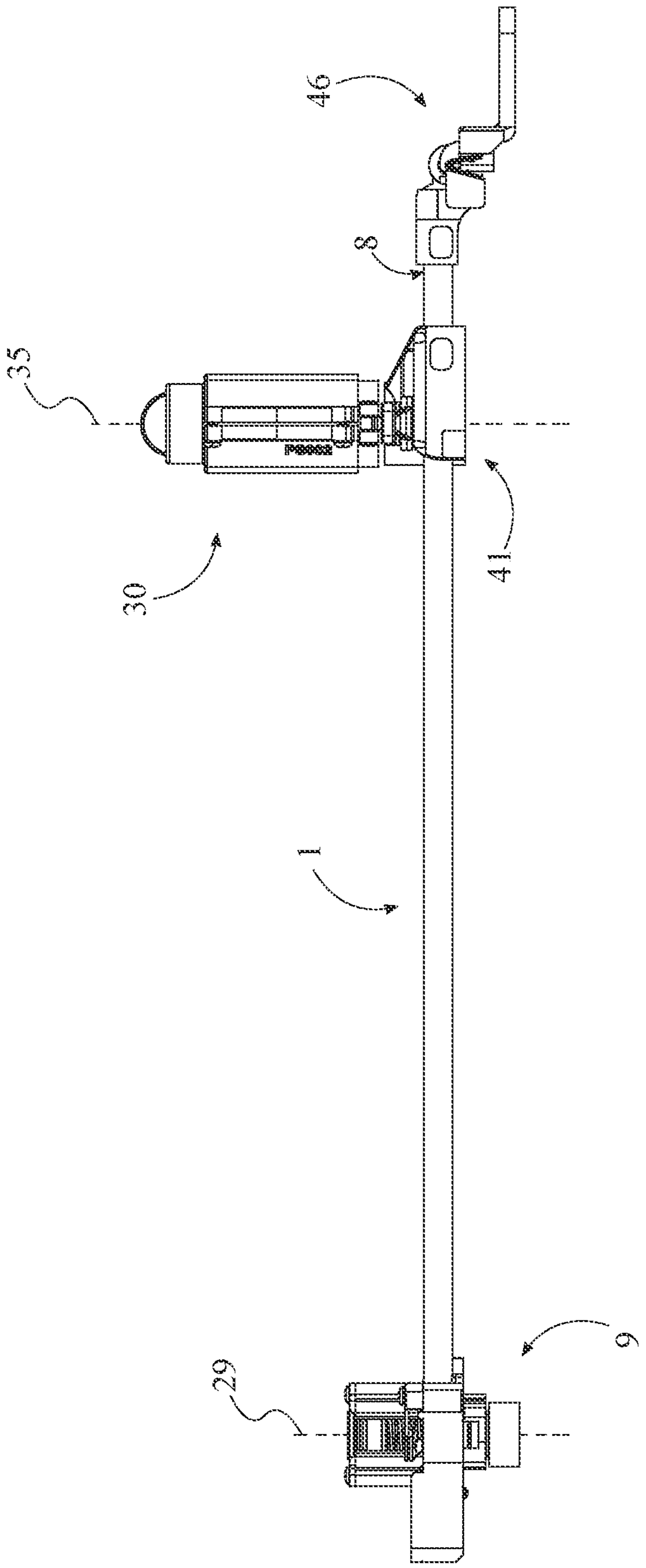
FIG. 5 is a right view of the present invention.
Figure 6:
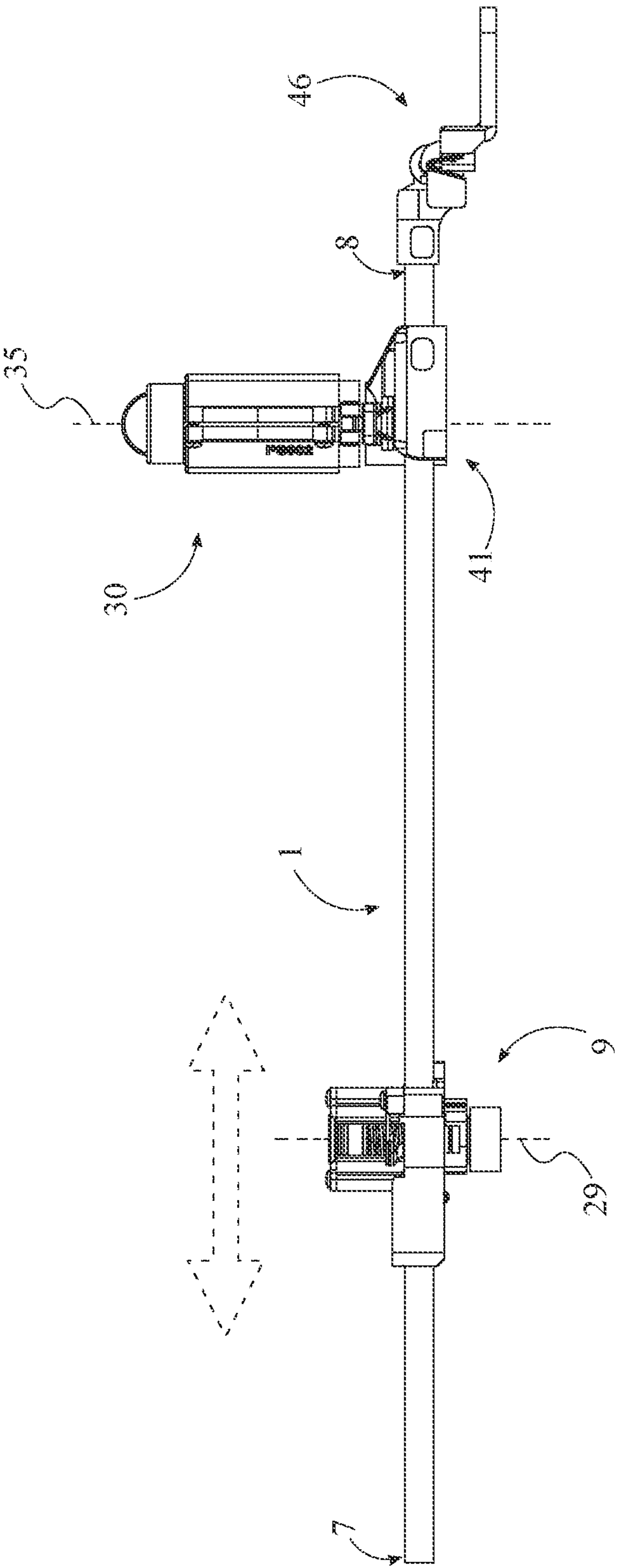
FIG. 6 is a right view of the present invention, wherein the releasable anchor is shown in a different location along the support bar.
Figure 7:
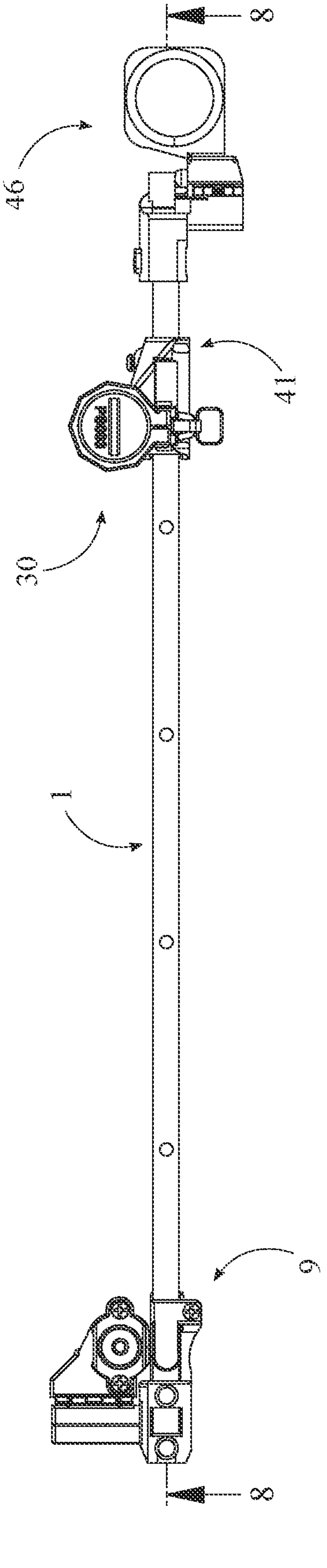
FIG. 7 is a top view of the present invention.
Figure 8:
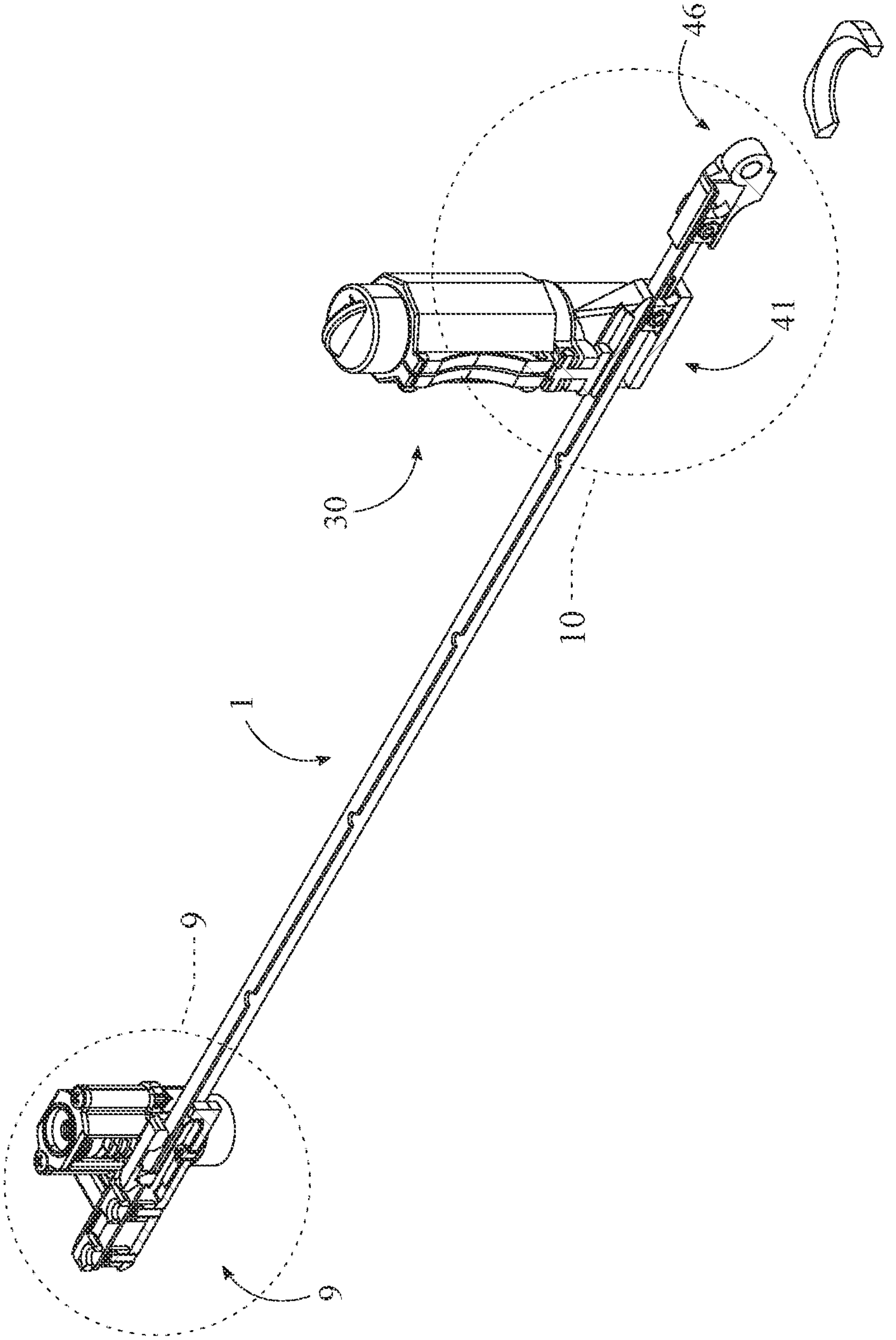
FIG. 8 is a vertical cross-sectional perspective view of the present invention taken in the direction of the line 8-8 in FIG. 7.
Figure 9:
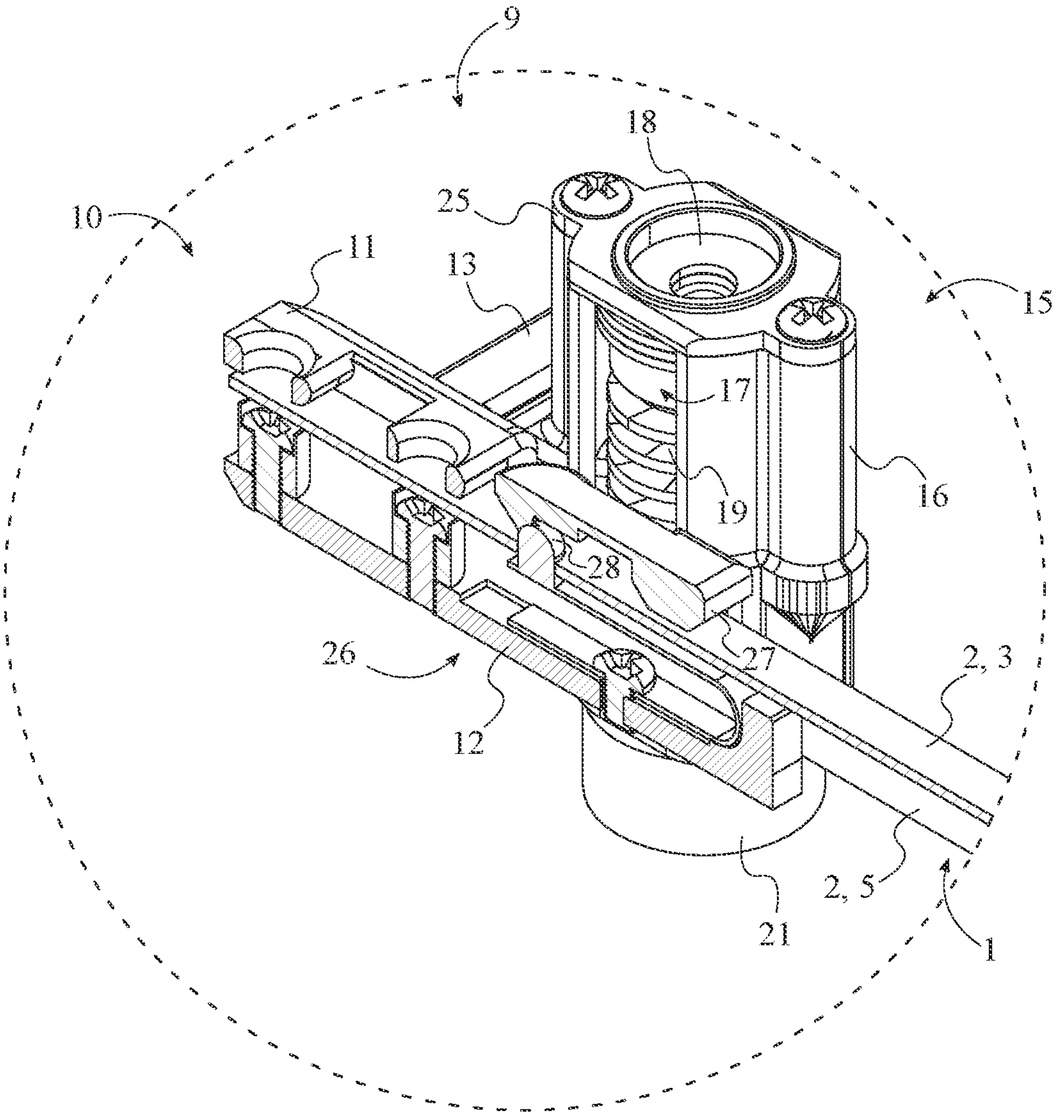
FIG. 9 is a magnified view of the releasable anchor and the support bar of the present invention shown in FIG. 8.
Figure 10:
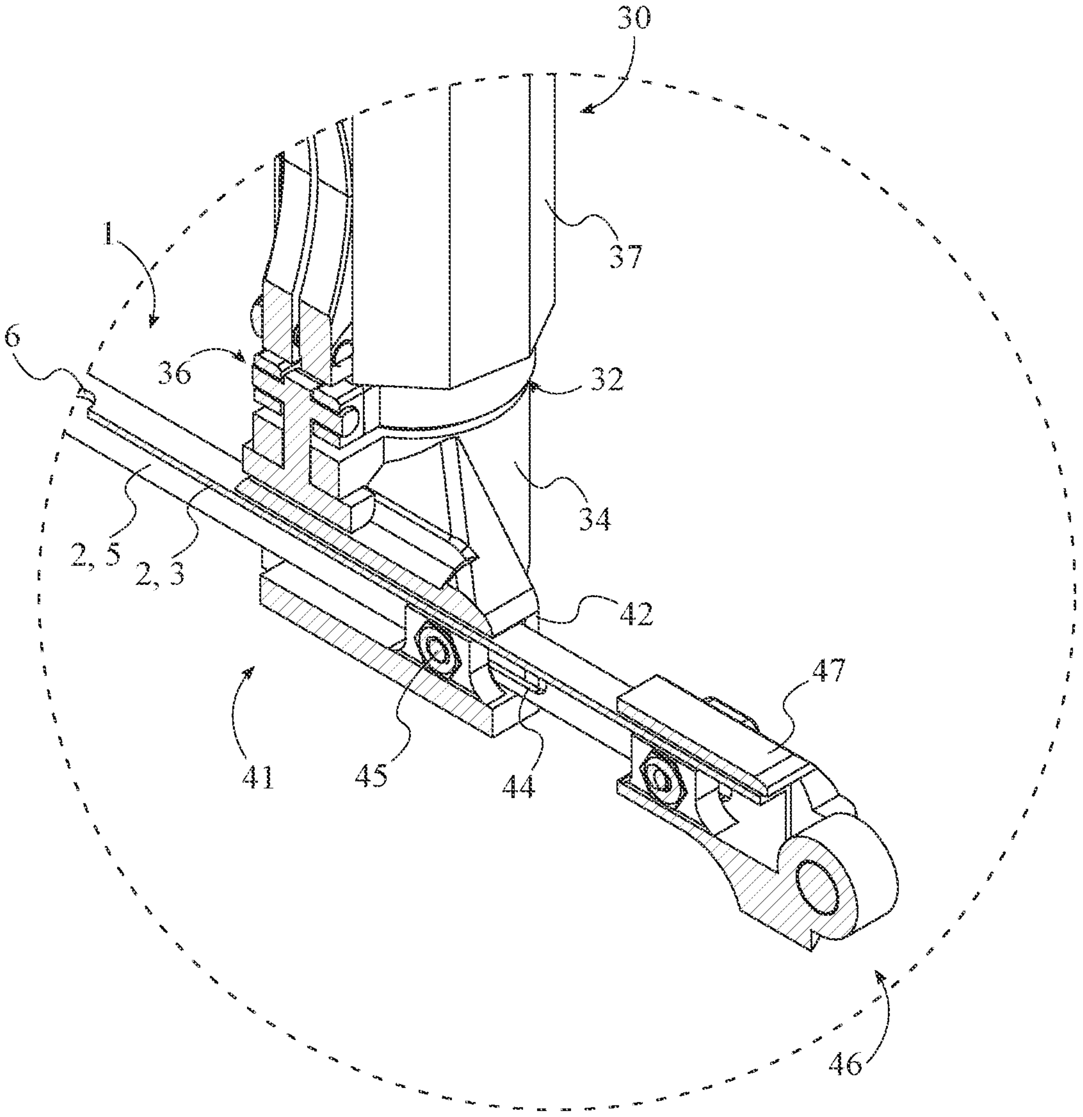
FIG. 10 is a magnified view of the marker holder, the holder clamp, the small-target stencil, and the support bar of the present invention shown in FIG. 8.

All illustrations of the drawings are for the purpose of describing selected versions of the present invention and are not intended to limit the scope of the present invention.

The present invention is a woodworking circle-drawing tool that enables users to draw precise circles for an axe throwing target. As can be seen in FIGS. 1 through 10, the present invention comprises a support bar 1, a releasable anchor 9, a marker holder 30, a holder clamp 41, and a small-target stencil 46. The support bar 1 serves to support the releasable anchor 9, the marker holder 30, and the small-target stencil 46. The support bar 1 also serves to keep the marker holder 30 at different distances from the releasable anchor 9 to draw the different sized circles. The releasable anchor 9 serves to secure the present invention to the target board using an appropriate fastener. The holder clamp 41 enables the attachment of the marker holder 30 to the support bar 1. The marker holder 30 enables the attachment of a marker that can be used to draw the target circles using the present invention. The small-target stencil 46 enables the drawing of smaller target circles often found in axe throwing targets.

The general configuration of the aforementioned components enables the user to quickly and accurately draw the several circles of an axe throwing target. As can be seen in FIGS. 1 through 10, the support bar 1 is an elongated, hollow, and rectangular bar long enough to accommodate the drawing of different sized circles on the target board. To do so, the support bar 1 comprises a U-shaped bar body 2, a plurality of bar holes 6, a first bar end 7, and a second bar end 8. The U-shaped bar body 2 is preferably U-shaped to reduce the overall weight of the assembly while providing the structural strength to support the different components. The plurality of bar holes 6 enables the control sliding of the releasable anchor 9 along the support bar 1. The first bar end 7 and the second bar end 8 correspond to the terminal ends of the U-shaped bar body 2. In the preferred embodiment, the present invention is assembled as follows. The plurality of bar holes 6 is distributed along the U-shaped bar body 2 to enable the releasable anchor 9 to slide along the support bar 1 at predetermined distances. For example, the plurality of bar holes 6 can be distributed at intervals corresponding to the different radiuses of the circles in the axe throwing target. Further, each of the plurality of bar holes 6 traverses through the U-shaped bar body 2 to enable the engagement of the releasable anchor 9 to the support bar 1. The releasable anchor 9 is also slidably mounted along the U-shaped bar body 2 so that the support bar 1 can still slide through the releasable anchor 9 once the releasable anchor 9 is fastened down.

Further, as can be seen in FIGS. 1 through 10, the small-target stencil 46 is mounted onto the second bar end 8 so that the small-target stencil 46 does not obstruct the sliding of the support bar 1 through the releasable anchor 9. In addition, the marker holder 30 is laterally attached to the U-shaped bar body 2 by the holder clamp 41. This way, the marker holder 30 is fixed onto a location along the U-shaped bar but can also be moved to a different location by releasing the holder clamp 41. The marker holder 30 is also positioned in between the releasable anchor 9 and the small-target stencil 46 so that the marker holder 30 can be moved closer or farther from the releasable anchor 9. Furthermore, the releasable anchor 9 is engaged with a selected bar hole from the plurality of bar holes 6. Thus, once the user fastens the releasable anchor 9 to the target board, the user can draw several circles by drawing a first circle, sliding the support bar 1 so that the marker holder 30 is moved closer to the releasable anchor 9, and then drawing a smaller circle. This process can be repeated several times to draw the necessary number of circles on the target board. The user can also draw smaller target circles using the small-target stencil 46 on the desired locations around the target board.

Figure 11:
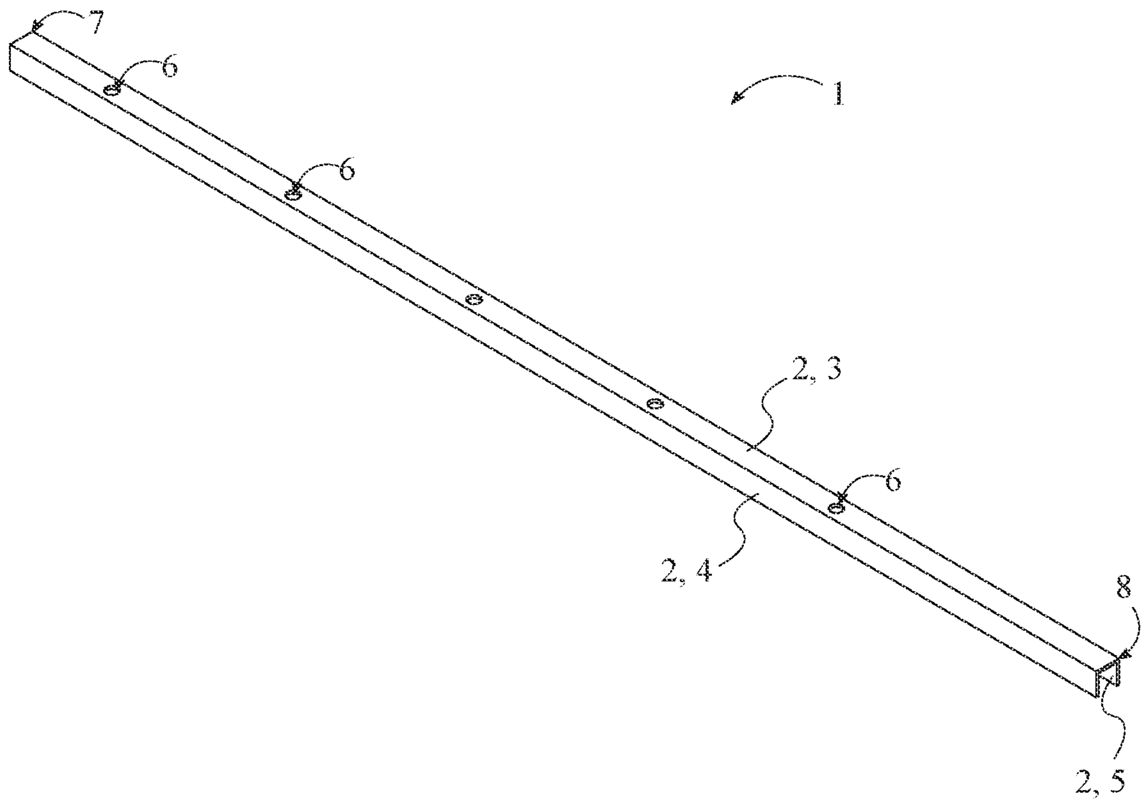
FIG. 11 is a top-front-right perspective view of the support bar of the present invention.
Figure 12:
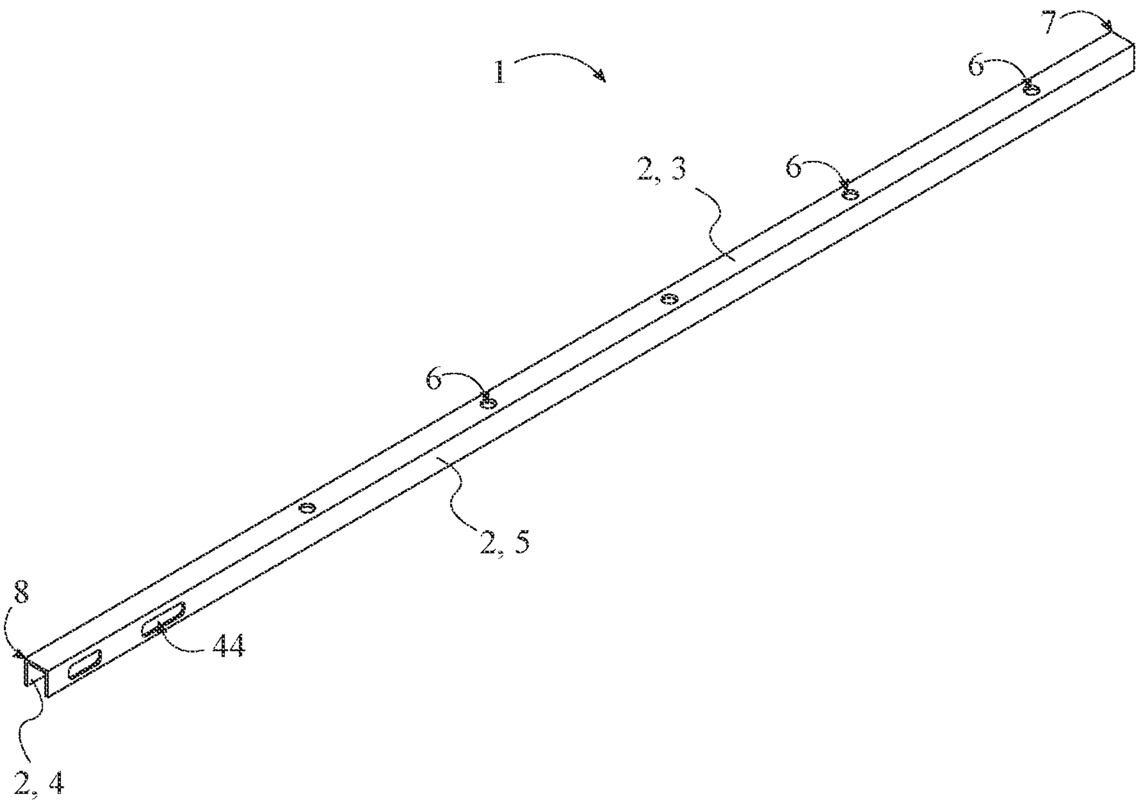
FIG. 12 is a top-front-left perspective view of the support bar of the present invention.
Figure 13:
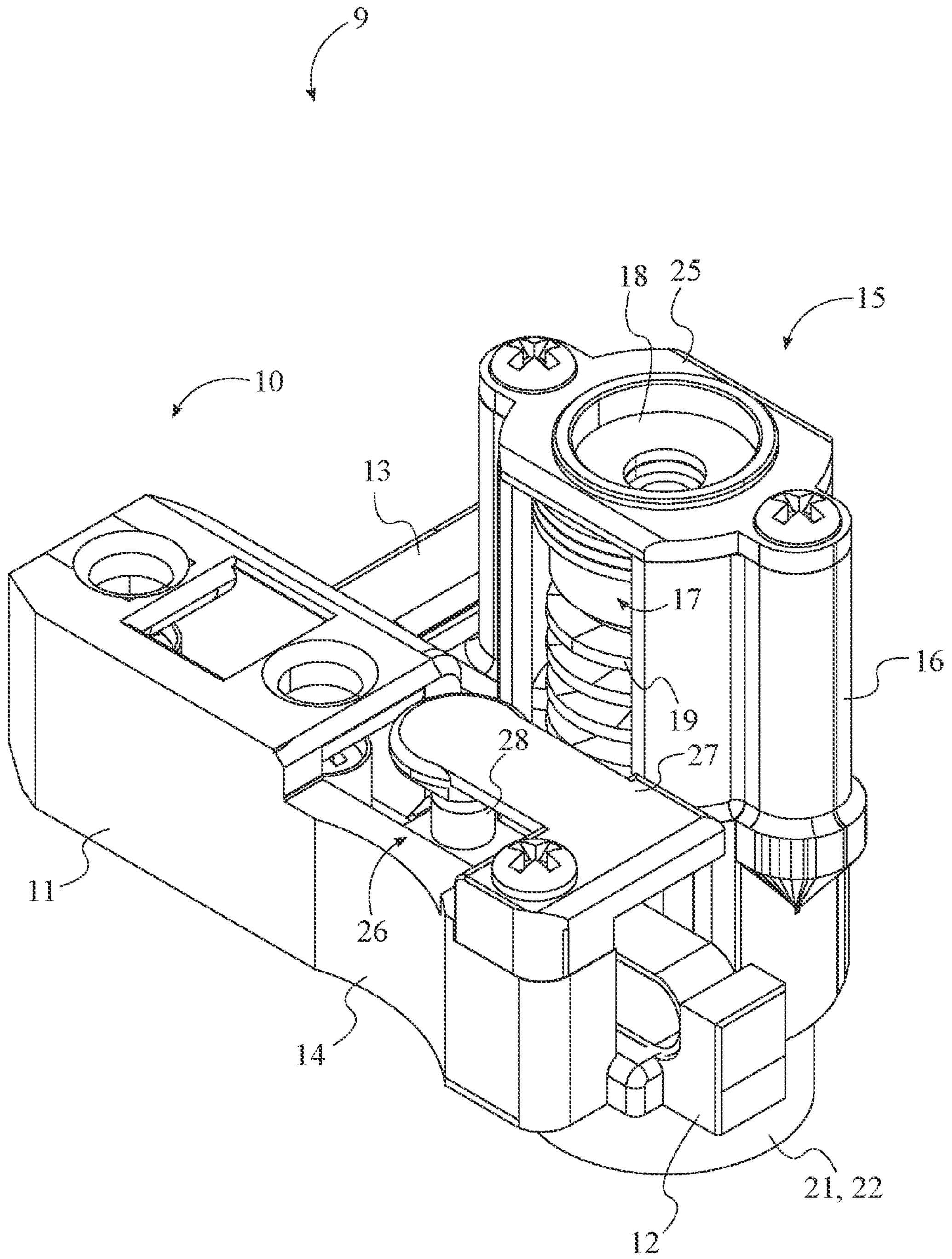
FIG. 13 is a top-front-right perspective view of the releasable anchor of the present invention.
Figure 14:
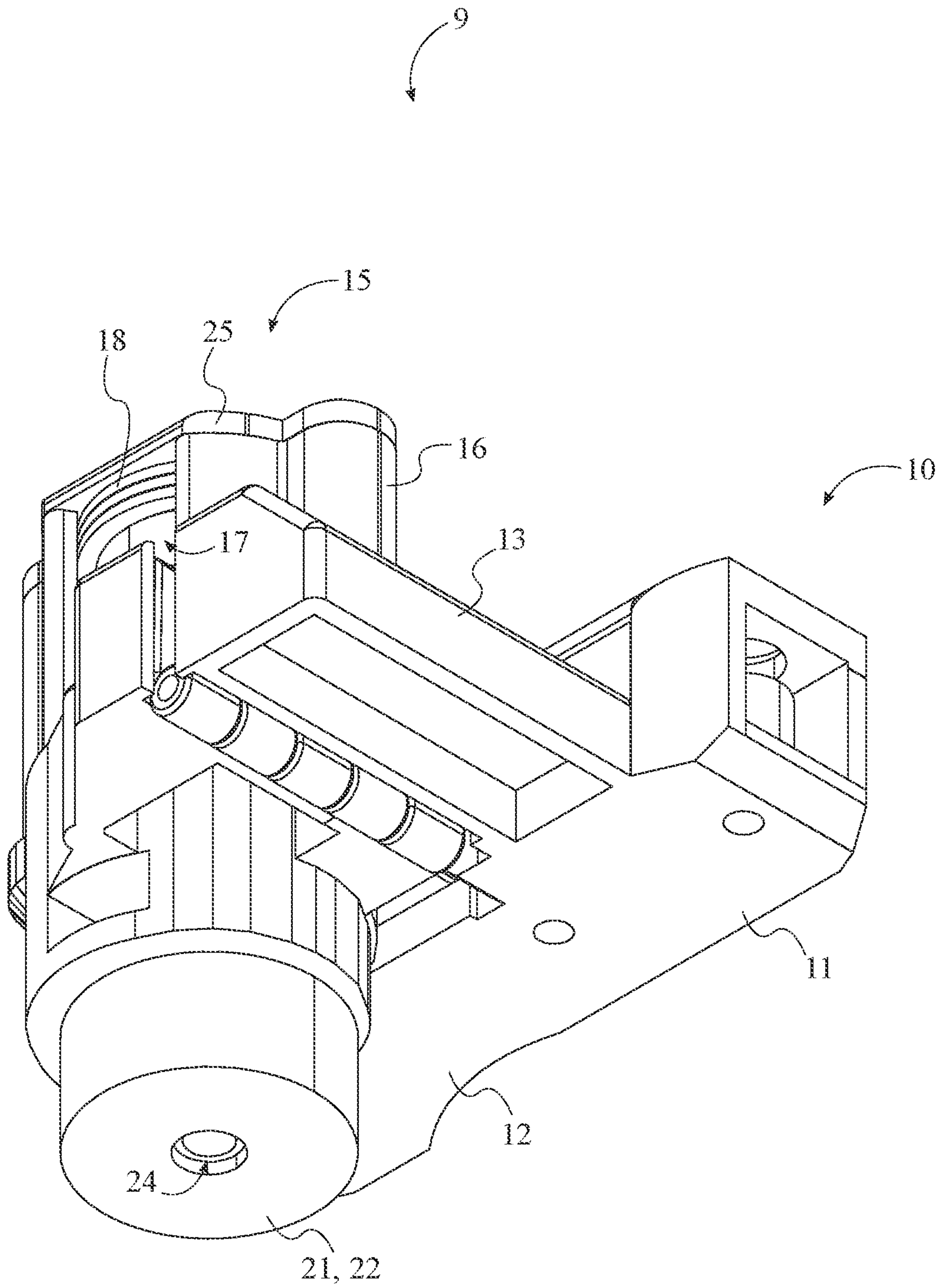
FIG. 14 is a bottom-rear-left perspective view of the releasable anchor of the present invention.
Figure 15:
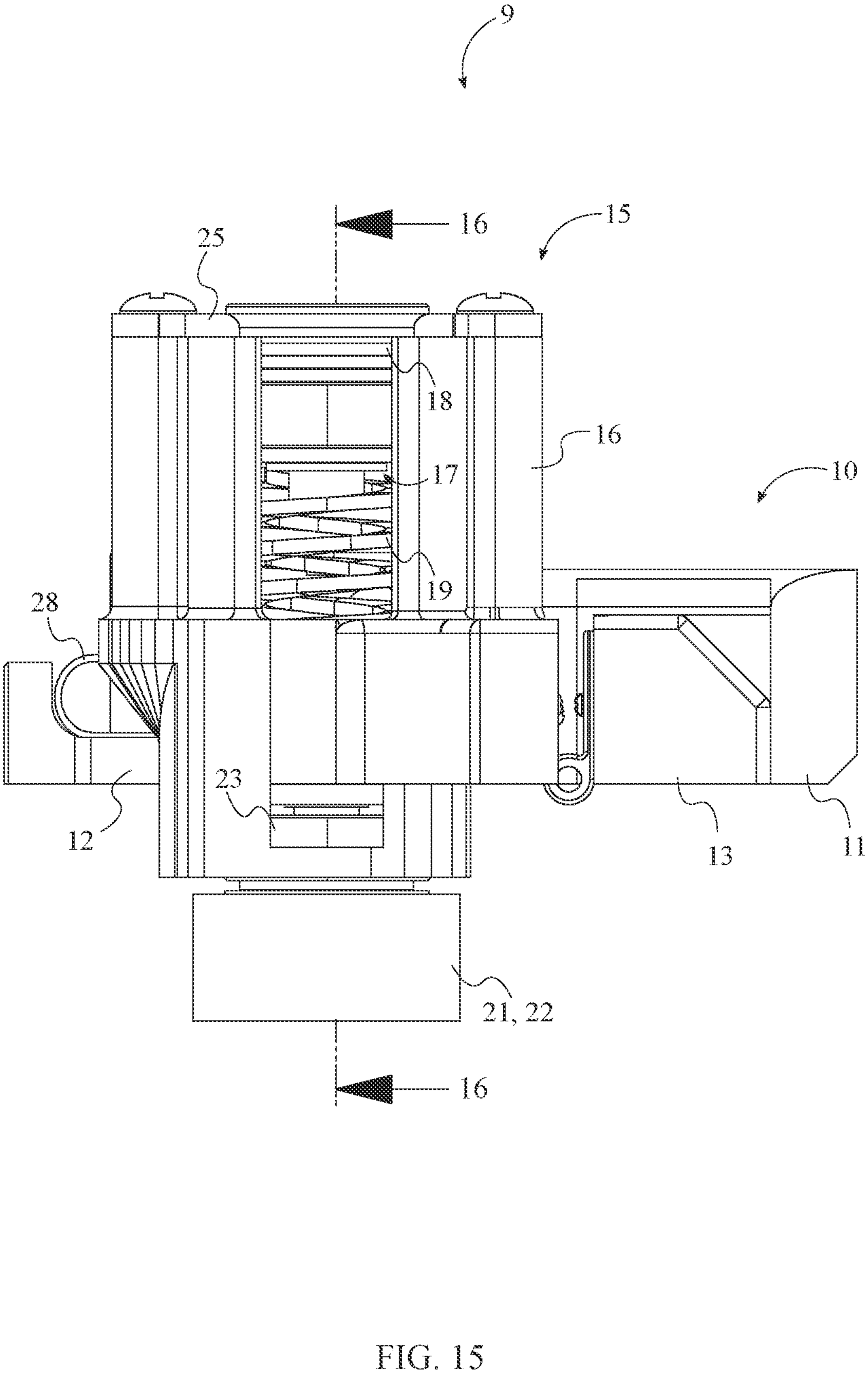
FIG. 15 is a right view of the releasable anchor of the present invention.
Figure 16:
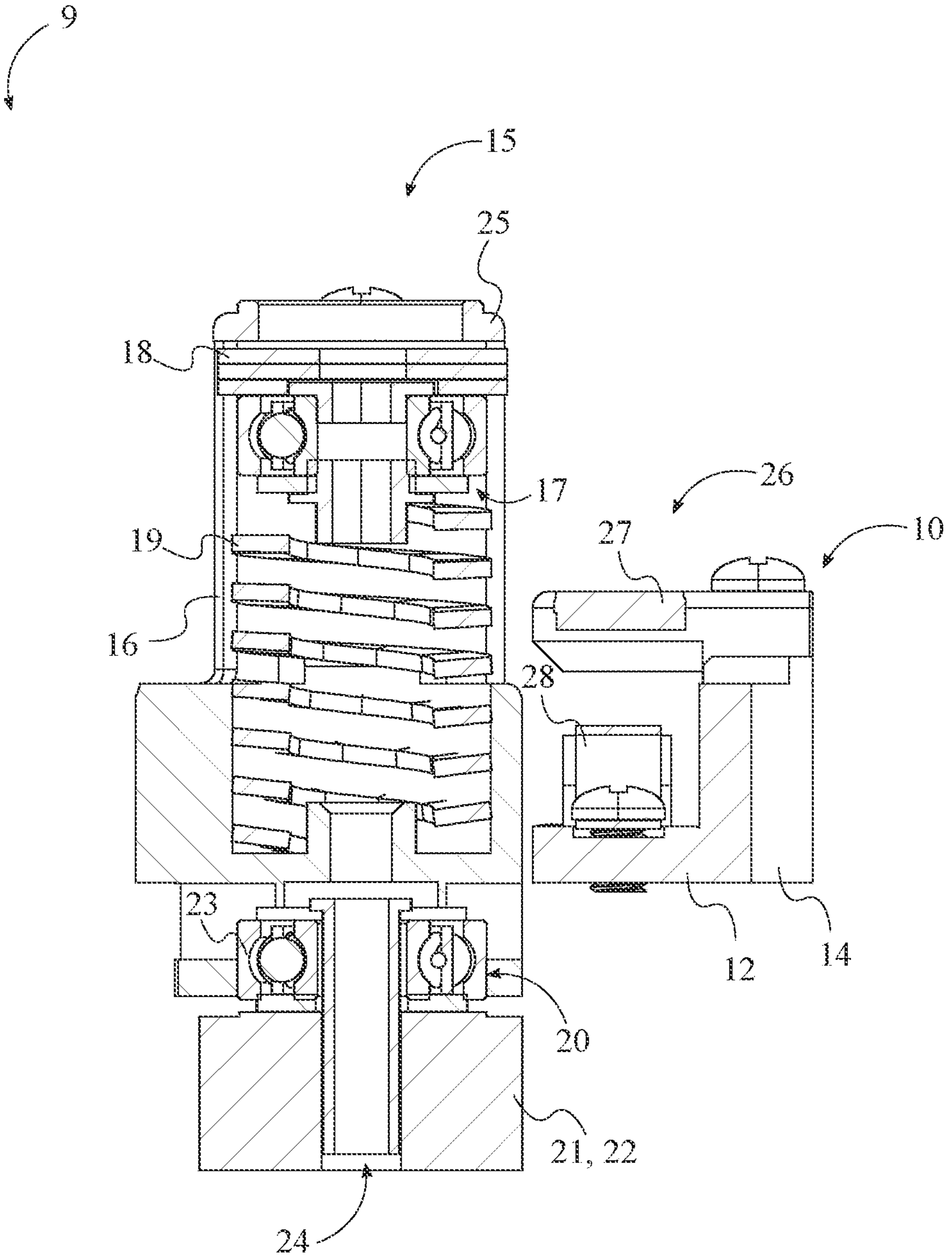
FIG. 16 is a vertical cross-sectional view of the releasable anchor of the present invention taken in the direction of the line 16-16 in FIG. 15.
Figure 17:
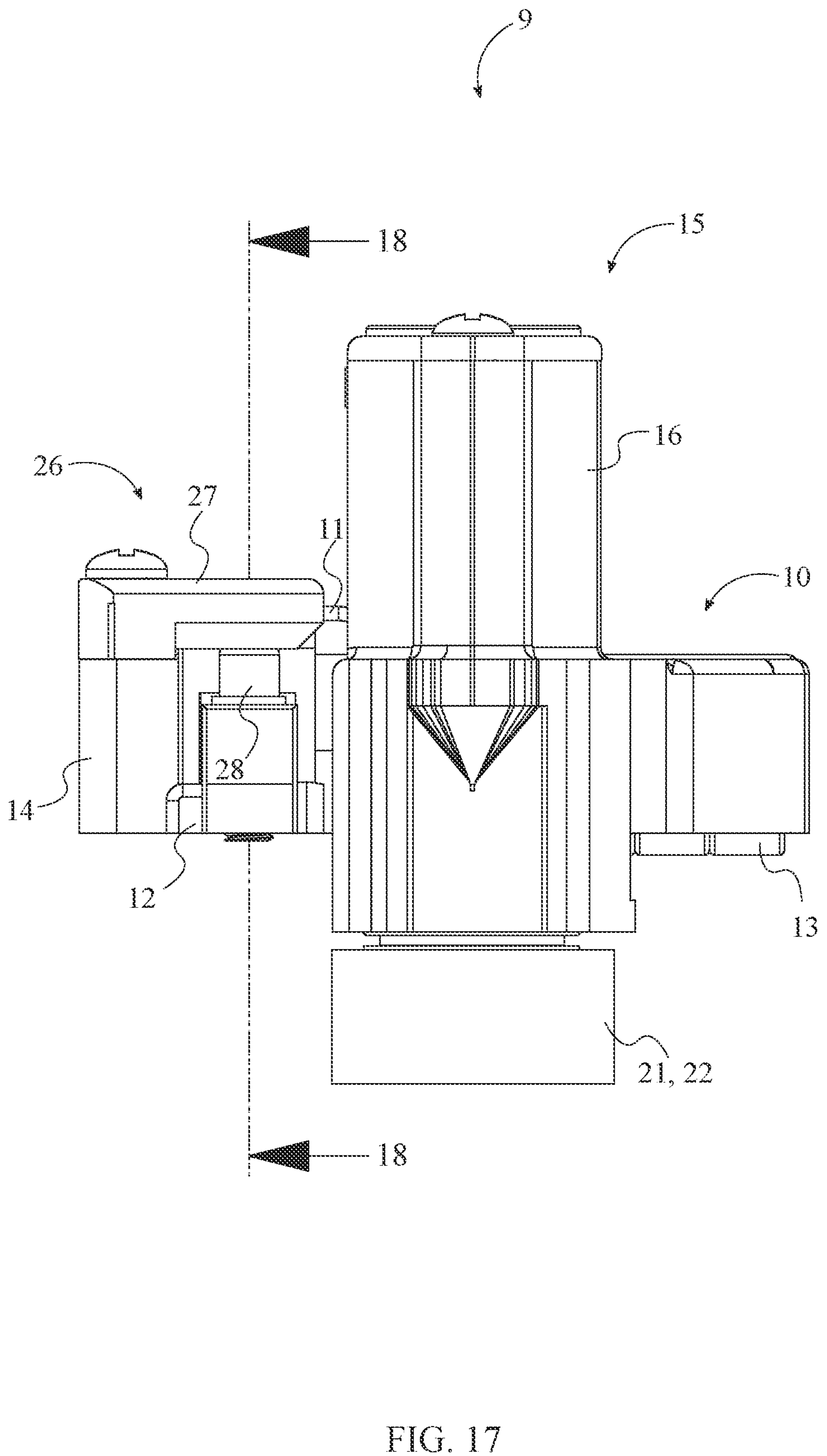
FIG. 17 is a front view of the releasable anchor of the present invention.
Figure 18:
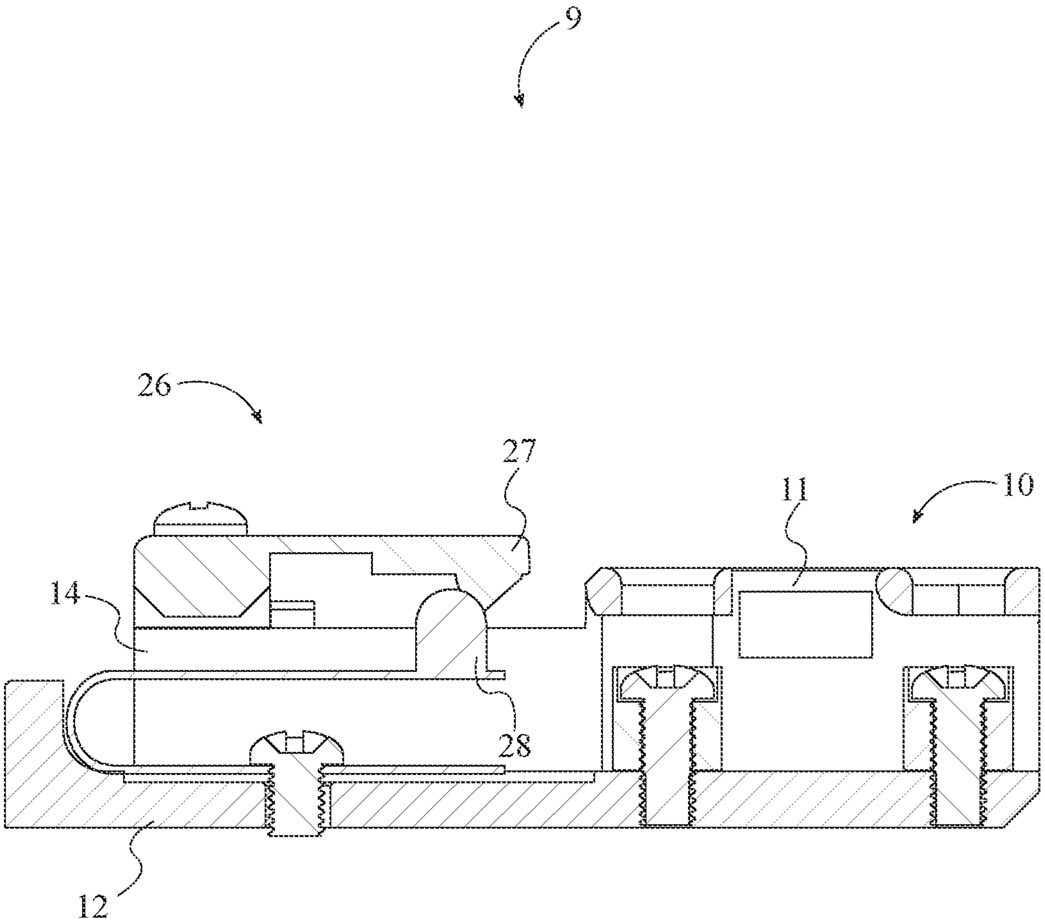
FIG. 18 is a vertical cross-sectional view of the releasable anchor of the present invention taken in the direction of the line 18-18 in FIG. 17.
Figure 19:
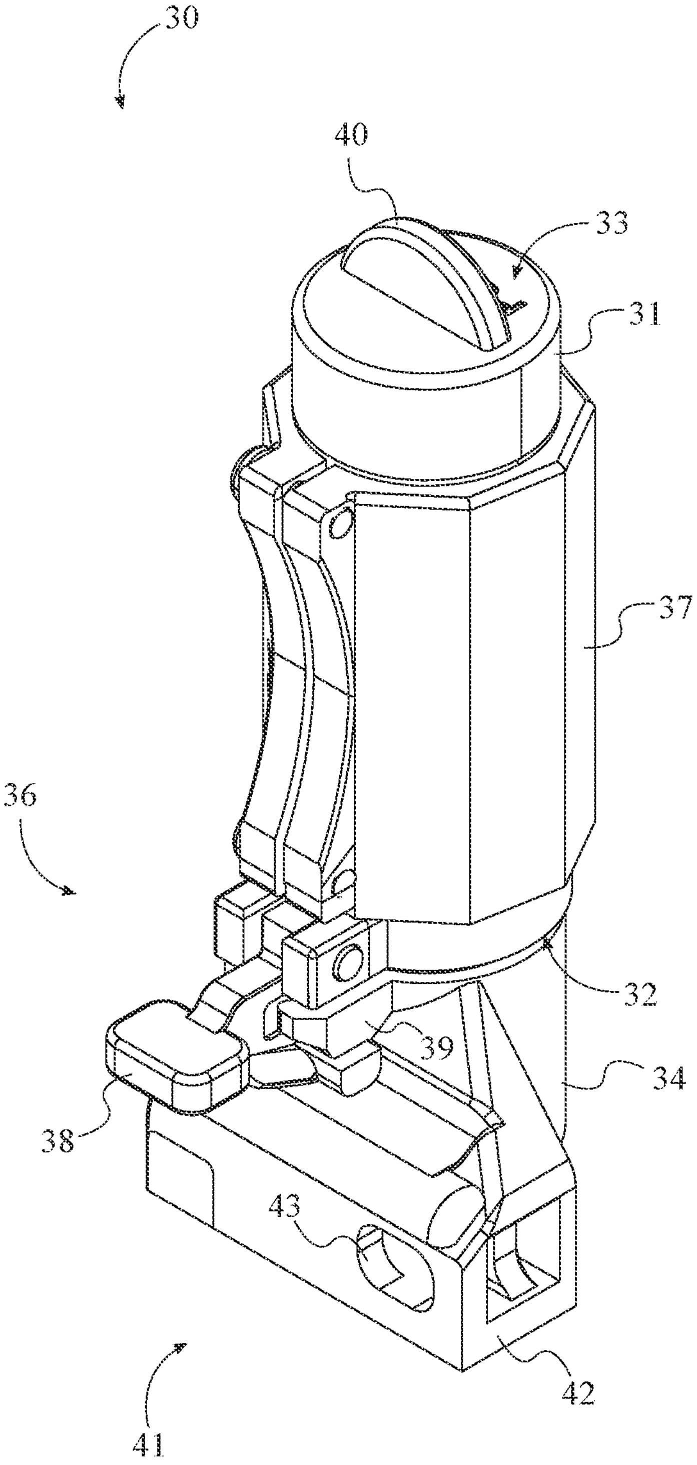
FIG. 19 is a top-front-right perspective view of the marker holder and the holder clamp of the present invention.
Figure 20:
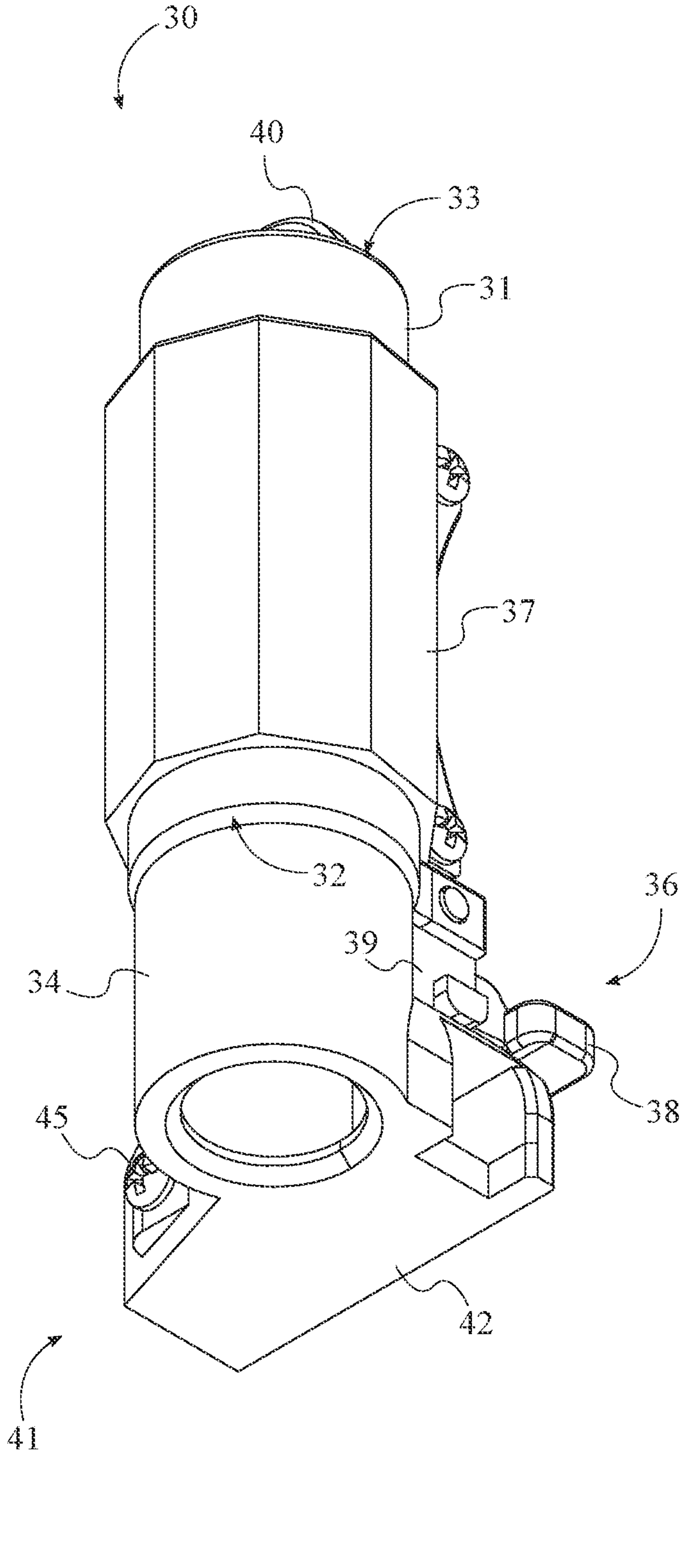
FIG. 20 is a bottom-rear-left perspective view of the marker holder and the holder clamp of the present invention.
Figure 21:
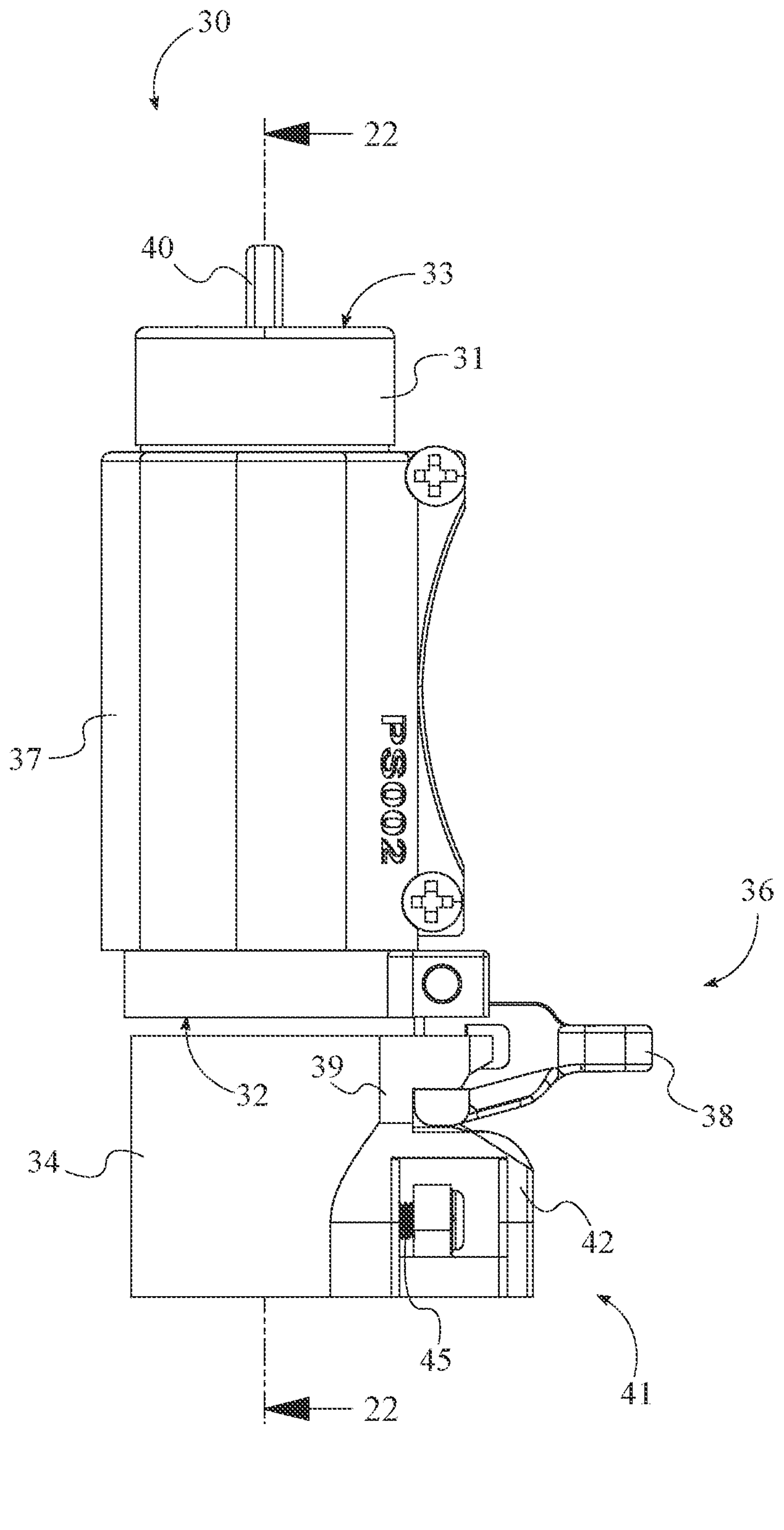
FIG. 21 is a rear view of the marker holder and the holder clamp of the present invention.
Figure 22:
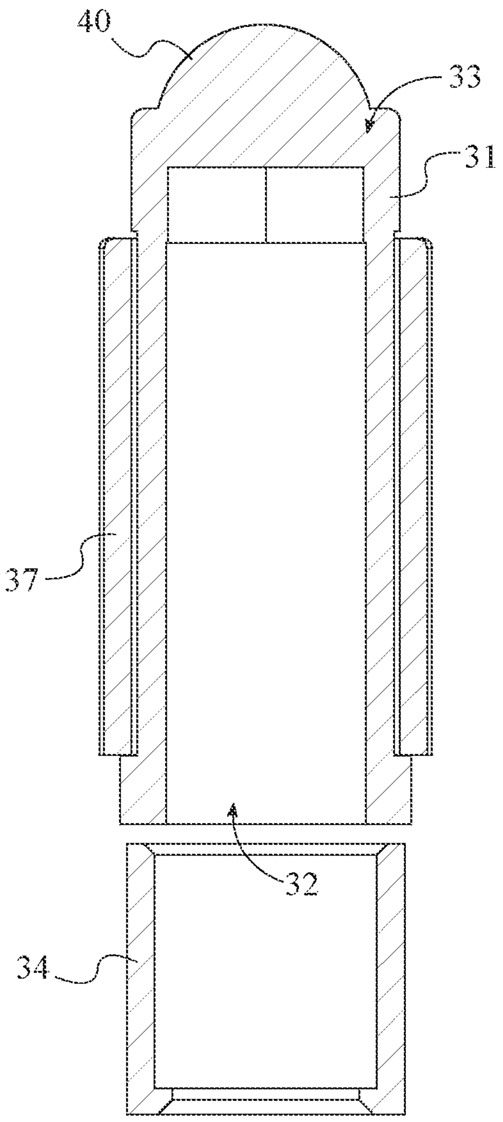
FIG. 22 is a vertical cross-sectional view of the marker holder and the holder clamp of the present invention taken in the direction of the line 22-22 in FIG. 21.
Figure 23:
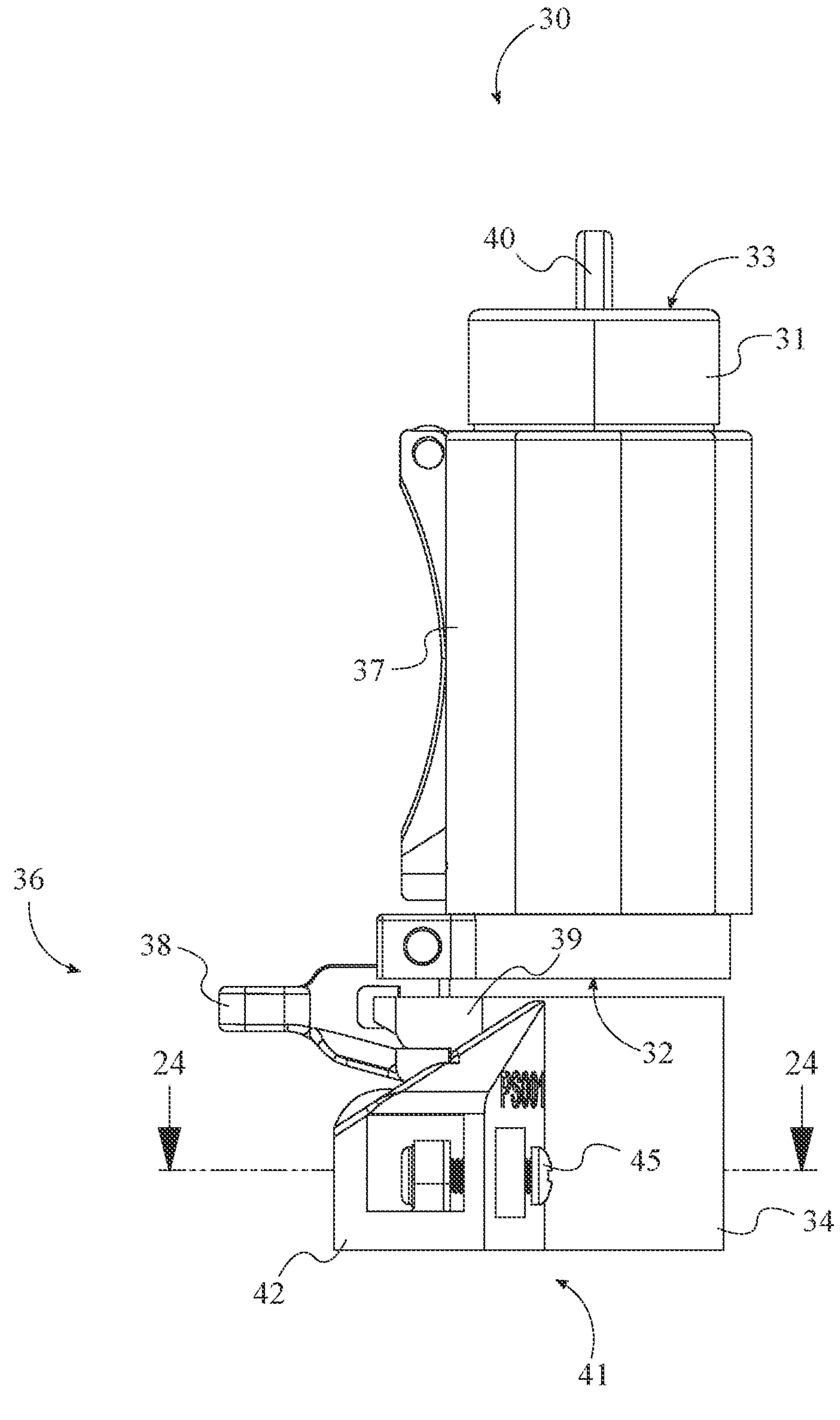
FIG. 23 is a front view of the marker holder and the holder clamp of the present invention.
Figure 24:
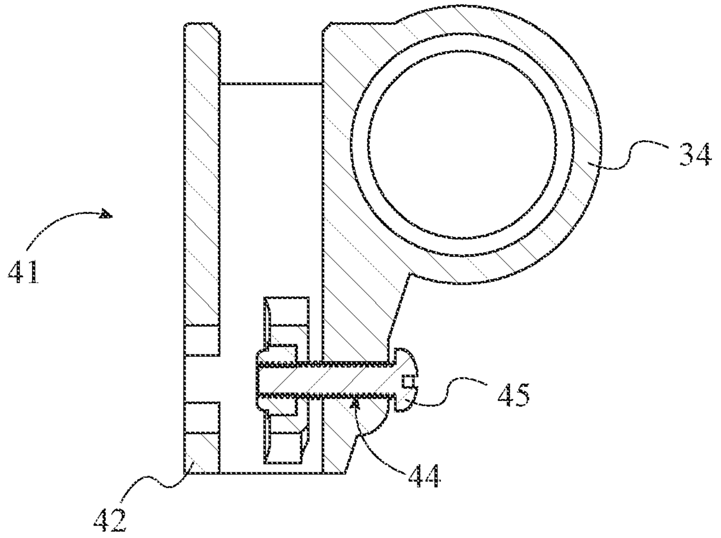
FIG. 24 is a horizontal cross-sectional view of the marker holder and the holder clamp of the present invention taken in the direction of the line 24-24 in FIG. 23.
Figure 25:
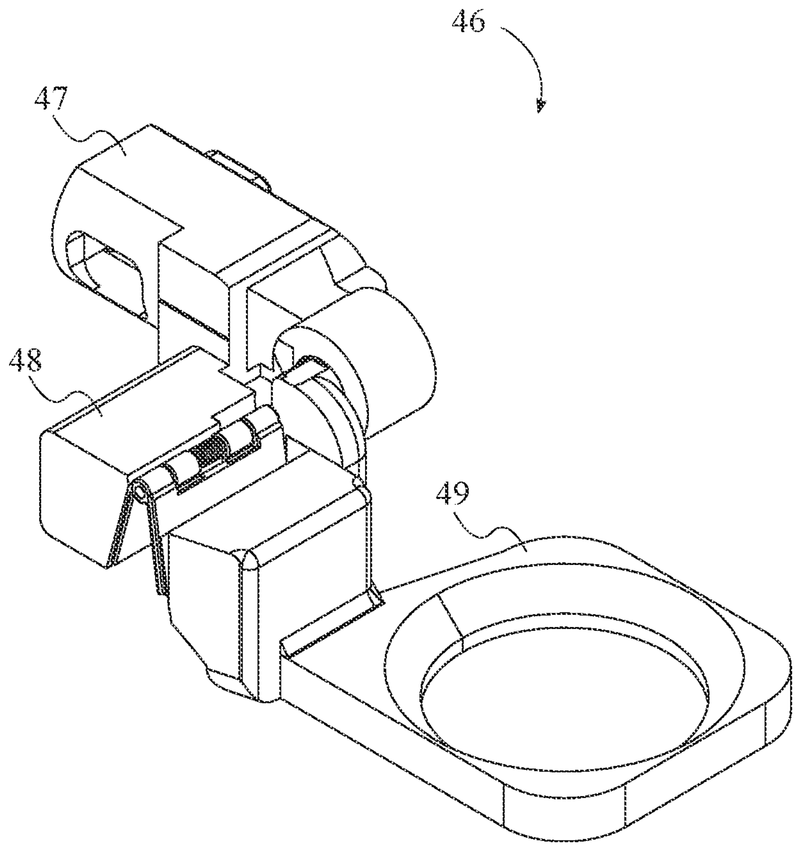
FIG. 25 is a top-front-right perspective view of the small-target stencil of the present invention.
Figure 26:
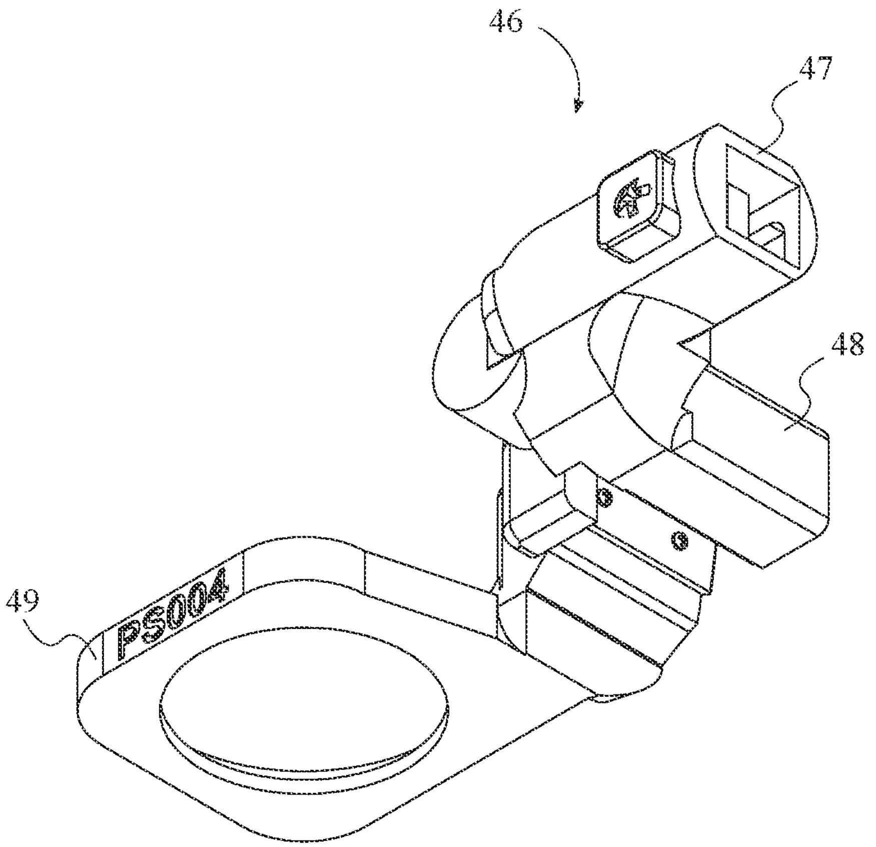
FIG. 26 is a bottom-rear-left perspective view of the small-target stencil of the present invention.

As previously discussed, the support bar 1 is designed to be light weight and durable so that the present invention can constantly enable the precise drawing of target circles. As can be seen in FIGS. 11 and 12, the U-shaped bar body 2 may comprise a central web 3, a first leg 4, and a second leg 5. The central web 3 corresponds to the central portion of the support bar 1 that enables the attachment of the different components to the support bar 1. The first leg 4 and the second leg 5 provide structural strength to the support bar 1. Further, the first leg 4 is positioned parallel and offset to the second leg 5 to form a symmetrical structure. The first leg 4 and the second leg 5 are also positioned perpendicular to the central web 3. The first leg 4 is connected adjacent and along the central web 3 to secure the first leg 4 to the central web 3. Similarly, the second leg 5 is connected adjacent and along the central web 3, opposite to the first leg 4 to secure the second leg 5 to the central web 3. Thus, the cross-sectional U-shape of the support bar 1 is formed. Furthermore, the plurality of bar holes 6 is distributed along the central web 3 at intervals corresponding to the different radiuses of the circles of the target board. Each of the plurality of bar holes 6 also traverses through the central web 3 to enable the engagement of the different components to the support bar 1. In other embodiments, the support bar 1 can be shaped differently to accommodate different attachment mechanisms.

As previously discussed, the releasable anchor 9 enables the removable attachment of the present invention to a target board to enable the user to draw several precise circles. As can be seen in FIGS. 1 through 10 and 13 through 18, the releasable anchor 9 may comprise a bar carriage 10, a fastener guide 15, and a bar connector 26. The bar carriage 10 enables the slidable mounting of the releasable anchor 9 to the support bar 1. The fastener guide 15 enables the fastening of the releasable anchor 9 to the target board using different fasteners such as a screw or a bolt. The bar connector 26 enables releasable fastening of the bar carriage 10 to the support bar 1. Further, the bar carriage 10 comprises a carriage sleeve 11, a carriage leg 12, a carriage arm 13, and an extension wall 14. The carriage sleeve 11 corresponds to the outer structure of the bar carriage 10 that surrounds the support bar 1. The carriage leg 12 provides support to the bar connector 26. The carriage arm 13 enables the lateral connection of the fastener guide 15 to the bar carriage 10. The extension wall 14 provides lateral support to the bar connector 26. Further, the bar connector 26 comprises a release arm 27 and a spring-loaded pin 28. The release arm 27 enables the user to reposition the marker holder 30 at a distance from the releasable anchor 9. The spring-loaded pin 28 enables the sliding of the support bar 1 through the carriage sleeve 11 in a single direction so that the user can draw several circles consecutively.

In the preferred embodiment, the releasable anchor 9 can be assembled as follows. As can be seen in FIGS. 1 through 10 and 13 through 18, the extension wall 14 is connected perpendicular and along the carriage leg 12 to form an elongated structure. The carriage sleeve 11 is also terminally connected to the carriage leg 12 and the extension wall 14 to secure the carriage leg 12 and the extension wall 14 to the carriage sleeve 11. Further, the carriage sleeve 11 is slidably mounted around the U-shaped bar body 2 to only allow the carriage sleeve 11 to slide along the U-shaped bar body 2. The carriage arm 13 is positioned perpendicular to the carriage sleeve 11 to position the fastener guide 15 lateral to the carriage arm 13. The carriage sleeve 11 is also terminally connected to the carriage arm 13 to secure the carriage arm 13 to the carriage sleeve 11. The fastener guide 15 is laterally positioned to the carriage arm 13 to maintain the fastener guide 15 adjacent to the carriage sleeve 11. The fastener guide 15 is also hingedly connected to the carriage arm 13 to enable the user to lift the marker from the target board, if necessary, without removing the fastener guide 15 from the target board. Further, the spring-loaded pin 28 is terminally connected to the carriage leg 12, opposite to the carriage sleeve 11, to secure the spring-loaded pin 28 to the carriage leg 12. The spring-loaded pin 28 is laterally positioned into the U-shaped bar body 2 so that the spring-loaded pin 28 is positioned against the central web 3 within the U-shaped bar body 2. Further, the spring-loaded pin 28 is engaged with the selected bar hole to releasably secure the bar carriage 10 to the support bar 1. The spring-loaded pin 28 is arranged so that when the support bar 1 is slid through the carriage sleeve 11 in a first direction, the spring-loaded pin 28 self-releases from the selected bar hole. The first direction preferably corresponds to the direction where the marker holder 30 gets closer to the releasable anchor 9. This enables the user to draw the different sized circles consecutively. On the other hand, when the support bar 1 is slid through the carriage sleeve 11 in a second direction, opposite to the first direction, the spring-loaded pin 28 is locked into the selected bar hole. This prevents accidental drawing on the target board. The second direction preferably corresponds to the direction where the marker holder 30 gets farther from the releasable anchor 9. Further, the release arm 27 is terminally connected to the extension wall 14, opposite to the carriage sleeve 11, to secure the release arm 27 to the carriage sleeve 11. Furthermore, the release arm 27 and the carriage leg 12 are positioned opposite to each other across extension wall 14 to leave the release arm 27 accessible to the user. The free end of the release arm 27 is positioned against the spring-loaded pin 28 so that the user can press on the release arm 27 to release the spring-loaded pin 28 from the selected bar hole. This way, the user can move the marker holder 30 to the starting position once the user has finished drawing all the circles on the target board.

As can be seen in FIGS. 1 through 10 and 13 through 18, the fastener guide 15 is designed to fasten the releasable anchor 9 to the target board in such a way that the fastener guide 15 stays in the target location along the support bar 1 while the user is drawing the circles. The fastener guide 15 also serves as a pivot to enable the user to rotate the marker holder 30 around the fastener guide 15. To do so, the fastener guide 15 may comprise a guide body 16, a cylindrical cavity 17, a fastener-bracing washer 18, a compression spring 19, a base hole 20, and an anchoring pivot 21. The guide body 16 corresponds to a hollow structure that holds the fastener-bracing washer 18 and the compression spring 19 together. The cylindrical cavity 17 corresponds to the empty space within the guide body 16 where the fastener-bracing washer 18 and the compression spring 19 can move vertically. The fastener-bracing washer 18 serves to hold the fastener head. The compression spring 19 enables the fastening of the fastener guide 15 to the target board while enabling rotation of the guide body 16 on the anchoring pivot 21. The base hole 20 enables the insertion of the fastener through the fastener guide 15. The anchoring pivot 21 enables the rotation of the guide body 16 while the fastener guide 15 is fastened to the target board. Further, the anchoring pivot 21 may comprise a pivot body 22, a stabilizing plate 23, a fastener hole 24. The pivot body 22 corresponds to the body of the anchoring pivot 21. The stabilizing plate 23 corresponds to the plate that separates the compression spring 19 from the pivot body 22. The fastener hole 24 enables the insertion of the fastener through the pivot body 22.

In the preferred embodiment, the fastener guide 15 is assembled as follows. As can be seen in FIGS. 1 through 10 and 13 through 18, the cylindrical cavity 17 traverses into the guide body 16 to form a space within the guide body 16 that accommodates the fastener-bracing washer 18 and the compression spring 19. The base hole 20 traverses through the guide body 16 from the cylindrical cavity 17 to enable the fastener body to pass through the guide body 16. Further, the compression spring 19, the fastener-bracing washer 18, and the stabilizing plate 23 are positioned within the cylindrical cavity 17 to dampen the vertical force of the fastener on the fastener guide 15 so that guide body 16 can rotate on the anchoring pivot 21. The stabilizing plate 23 is positioned adjacent to the base hole 20, and the compression spring 19 is positioned in between the stabilizing plate 23 and the fastener-bracing washer 18. This way, the fastener tip can pass through the fastener-bracing washer 18, the compression spring 19, and the stabilizing plate 23 until the fastener head engages the fastener-bracing washer 18. Further, the pivot body 22 is externally positioned to the guide body 16, adjacent to the base hole 20, to position the pivot body 22 under the guide body 16. The pivot body 22 is also torsionally connected to the stabilizing plate 23 through the base hole 20 so that the guide body 16 can rotate on the pivot body 22 while the user draws a circle. Further, the fastener hole 24 traverses through the stabilizing plate 23 and the pivot body 22 to enable the fastener body to pass through the pivot body 22. Furthermore, the fastener hole 24, the compression spring 19, and the fastener-bracing washer 18 are coaxially aligned with each other along a rotation axis 29 of the releasable anchor 9. The fastener tip can pass through the fastener-bracing washer 18, the compression spring 19, the stabilizing plate 23, and the pivot body 22 into the target board until the fastener tip engages with the target board and the fastener head engages the fastener-bracing washer 18. This way, the fastener guide 15 is fastened to the target board while enabling the fastener guide 15 to pivot around the fastener while the user draws a circle. In other embodiments, additional washers of different materials as well as rubber rings can be included to reduce friction between the compression spring 19 and the fastener-bracing washer 18 and the stabilizing plate 23.

As can be seen in FIGS. 13 through 18, to facilitate the maintenance of the fastener guide 15, the fastener guide 15 may further comprise an annular cap 25. The annular cap 25 serves to keep the fastener-bracing washer 18 and the compression spring 19 within the cylindrical cavity 17. The annular cap 25 can also be removed to replace the compression spring 19 and other components within the guide body 16. To do so, the annular cap 25 is positioned across an opening of the cylindrical cavity 17 to close the opening of the cylindrical cavity 17. The annular cap 25 is also attached onto the guide body 16 to secure the annular cap 25 to the guide body 16. In other embodiments, the annular cap 25 can be replaced with other sealing mechanisms.

As previously discussed, the marker holder 30 is designed to receive a thick marker to draw clear and precise circles on the target board. As can be seen in FIGS. 1 through 10 and 19 through 24, the marker holder 30 may comprise a marker-retaining tube 31, an annular setting 34, and a snap connector 36. The marker-retaining tube 31 corresponds to the structure where the marker is inserted into. The annular setting 34 enables the user to correctly position the marker held by the marker-retaining tube 31 on the holder clamp 41. The snap connector 36 enables the removable attachment of the marker holder 30 to the holder clamp 41. Further, the marker-retaining tube 31 may comprise an open tube end 32 and a closed tube end 33 corresponding to the terminal ends of the marker-retaining tube 31. A marker body can be inserted into the marker-retaining tube 31 through the open tube end 32. The marker tip is left protruding out of the marker-retaining tube 31. In the preferred embodiment, the snap connector 36 and the annular setting 34 are laterally connected to the holder clamp 41 to secure the snap connector 36 and the annular setting 34 to the holder clamp 41. A central axis 35 of the annular setting 34 is positioned parallel to a rotation axis 29 of the releasable anchor 9 so that the releasable anchor 9 serves as the center of the circle being drawn using the marker in the marker-retaining tube 31. Further, the marker-retaining tube 31 is coaxially aligned with the annular setting 34 so that the marker inside the marker-retaining tube 31 is also coaxially aligned with the annular setting 34. The open tube end 32 is positioned adjacent to the annular setting 34 while the closed tube end 33 is positioned offset from the annular setting 34. This way, the marker tip can pass through the annular setting 34 once the marker-retaining tube 31 is positioned on the annular setting 34. Further, the marker-retaining tube 31 is attached against the annular setting 34 by the snap connector 36 to secure the marker-retaining tube 31 to the holder clamp 41 to prevent the marker from coming loose.

As can be seen in FIGS. 1 through 10 and 19 through 24, to enable the user to grab onto the marker-retaining tube 31 while drawing a circle with a single hand, the marker holder 30 may further comprise a holder handle 40. The holder handle 40 is preferably a thin semi-circular protrusion large enough to be held with two fingertips. To do so, the holder handle 40 is externally positioned to the marker-retaining tube 31 so that the user can hold onto holder handle 40. Further, the holder handle 40 is connected to the closed tube end 33 so that the user can have a secure grip onto the marker-retaining tube 31 without holding the marker-retaining tube 31. In other embodiments, the holder handle 40 can be replaced with other gripping mechanisms.

As can be seen in FIGS. 1 through 10 and 19 through 24, to enable the releasable fastening of the marker-retaining tube 31 to the annular setting 34 and the holder clamp 41, the snap connector 36 may comprise a tubular jacket 37, a snap hook 38, and a hook receiver 39. The tubular jacket 37 enables the secure attachment of the marker-retaining tube 31 while enabling the marker-retaining tube 31 to rotate within the tubular jacket 37. The snap hook 38 and the hook receiver 39 serve to removably connect the tubular jacket 37 to the holder clamp 41. To do so, the tubular jacket 37 is laterally mounted around the marker-retaining tube 31 to secure the tubular jacket 37 to the marker-retaining tube 31 via enough friction that still allows the marker-retaining tube 31 to spin within the tubular jacket 37. The snap hook 38 is also hingedly connected to the tubular jacket 37, adjacent to the open tube end 32, to secure the snap hook 38 to the tubular jacket 37. In addition, the hook receiver 39 is positioned adjacent to the annular setting 34 to position the hook receiver 39 on the holder clamp 41. The hook receiver 39 is also integrated into the holder clamp 41 to secure the hook receiver 39 to the holder clamp 41. Thus, to secure the marker-retaining tube 31 to the holder clamp 41 via the tubular jacket 37, the snap hook 38 is engaged into the hook receiver 39. The user can simply release the snap hook 38 from the hook receiver 39 to remove the marker-retaining tube 31. In other embodiments, different releasable locking mechanism scan be used for the snap connector 36.

In the preferred embodiment, the holder clamp 41 is used to fasten the marker holder 30 to the support bar 1 at specific locations along the support bar 1. This way, when the support bar 1 slides through the releasable anchor 9, the holder clamp 41 and the marker holder 30 move along with the support bar 1. As can be seen in FIGS. 1 through 10 and 19 through 24, the holder clamp 41 may comprise a clamp sleeve 42, a sleeve hole 43, an oblong hole 44, and a clamp fastener 45. The clamp sleeve 42 corresponds to the body of the holder clamp 41 that is mounted onto the support bar 1. The sleeve hole 43 and the oblong hole 44 receive the clamp fastener 45 to secure the clamp sleeve 42 to the support bar 1. Accordingly, the clamp sleeve 42 is slidably mounted around the support bar 1 to enable the clamp sleeve 42 to move along the support bar 1. The oblong hole 44 laterally traverses into the support bar 1 to enable the clamp fastener 45 to be inserted into the support bar 1. Further, the sleeve hole 43 laterally traverses into the clamp sleeve 42 so that the clamp fastener 45 can pass through the sleeve hole 43. This way, when the oblong hole 44 and the sleeve hole 43 are aligned with each other, the clamp fastener 45 is engaged through the sleeve hole 43 and the oblong hole 44 to connect the holder clamp 41 to the support bar 1. In other embodiments, several oblong holes can be provided to enable the holder clamp 41 to be secured at different locations along the support bar 1.

As previously discussed, the small-target stencil 46 can be used to draw smaller circles around the target body which are often found in axe throwing boards. As can be seen in FIGS. 1 through 10, 25, and 26, the small-target stencil 46 may comprise a stencil setting 47, a stencil arm 48, and a stencil body 49. The stencil setting 47 enables the attachment of the stencil arm 48 to the support bar 1. The stencil arm 48 offsets the stencil body 49 from the stencil setting 47. The stencil body 49 enables the precise drawing of the small circles. Accordingly, the stencil setting 47 is terminally mounted to the second bar end 8 to secure the stencil setting 47 to the support bar 1. The stencil arm 48 is positioned orthogonal to the support bar 1 and a rotation axis 29 of the releasable anchor 9 to position the stencil arm 48 lateral to the support bar 1. Further, the stencil arm 48 is laterally connected to the stencil setting 47 to secure the stencil arm 48 to the stencil setting 47. In addition, the stencil body 49 is laterally positioned to the stencil arm 48 so that the stencil body 49 is positioned offset to the stencil setting 47. The stencil body 49 is also hingedly connected to the stencil arm 48 so that the stencil body 49 can be moved away from the target board when not in use. In other embodiments, the small-target stencil 46 can be replaced with other stencils that facilitate the drawing of other elements of an axe throwing board.

Although the invention has been explained in relation to its preferred embodiment, it is to be understood that many other possible modifications and variations can be made without departing from the spirit and scope of the invention.

What is claimed is:

1. A woodworking circle-drawing tool comprising:
a support bar;
a releasable anchor;
a marker holder;
a holder clamp;
a small-target stencil;
the support bar comprising a U-shaped bar body, a plurality of bar holes, a first bar end, and a second bar end;
the plurality of bar holes being distributed along the U-shaped bar body;
each of the plurality of bar holes traversing through the U-shaped bar body;
the releasable anchor being slidably mounted along the U-shaped bar body;
the small-target stencil being mounted onto the second bar end;
the marker holder being laterally attached to the U-shaped bar body by the holder clamp;
the marker holder being positioned in between the releasable anchor and the small-target stencil; and
the releasable anchor being engaged with a selected bar hole from the plurality of bar holes.

2. The woodworking circle-drawing tool as claimed in claim 1 comprising:
the U-shaped bar body comprising a central web, a first leg, and a second leg;
the first leg being positioned parallel and offset to the second leg;
the first leg and the second leg being positioned perpendicular to the central web;
the first leg being connected adjacent and along the central web;
the second leg being connected adjacent and along the central web, opposite to the first leg;
the plurality of bar holes being distributed along the central web; and
each of the plurality of bar holes traversing through the central web.

3. The woodworking circle-drawing tool as claimed in claim 1 comprising:
the releasable anchor comprising a bar carriage, a fastener guide, and a bar connector;
the bar carriage comprising a carriage sleeve, a carriage leg, a carriage arm, and an extension wall;
the bar connector comprising a release arm and a spring-loaded pin;
the extension wall being connected perpendicular and along the carriage leg;
the carriage sleeve being terminally connected to the carriage leg and the extension wall;
the carriage sleeve being slidably mounted around the U-shaped bar body;
the carriage arm being positioned perpendicular to the carriage sleeve;
the carriage sleeve being terminally connected to the carriage arm;
the fastener guide being laterally positioned to the carriage arm;
the fastener guide being hingedly connected to the carriage arm;
the spring-loaded pin being terminally connected to the carriage leg, opposite to the carriage sleeve;
the spring-loaded pin being laterally positioned into the U-shaped bar body;
the spring-loaded pin being engaged with the selected bar hole;
the release arm being terminally connected to the extension wall, opposite to the carriage sleeve; and
the release arm and the carriage leg being positioned opposite to each other across extension wall.

4. The woodworking circle-drawing tool as claimed in claim 3 comprising:
the fastener guide comprising a guide body, a cylindrical cavity, a fastener-bracing washer, a compression spring, a base hole, and an anchoring pivot;
the anchoring pivot comprising a pivot body, a stabilizing plate, a fastener hole;
the cylindrical cavity traversing into the guide body;
the base hole traversing through the guide body from the cylindrical cavity;
the compression spring, the fastener-bracing washer, and the stabilizing plate being positioned within the cylindrical cavity;
the stabilizing plate being positioned adjacent to the base hole;
the compression spring being positioned in between the stabilizing plate and the fastener-bracing washer;
the pivot body being externally positioned to the guide body, adjacent to the base hole;
the pivot body being torsionally connected to the stabilizing plate through the base hole;
the fastener hole traversing through the stabilizing plate and the pivot body; and
the fastener hole, the compression spring, and the fastener-bracing washer being coaxially aligned with each other along a rotation axis of the releasable anchor.

5. The woodworking circle-drawing tool as claimed in claim 4 comprising:
the fastener guide further comprising an annular cap;
the annular cap being positioned across an opening of the cylindrical cavity; and
the annular cap being attached onto the guide body.

6. The woodworking circle-drawing tool as claimed in claim 1 comprising:
the marker holder comprising a marker-retaining tube, an annular setting, and a snap connector;
the marker-retaining tube comprising an open tube end and a closed tube end;
the snap connector and the annular setting being laterally connected to the holder clamp;
a central axis of the annular setting being positioned parallel to a rotation axis of the releasable anchor;
the marker-retaining tube being coaxially aligned with the annular setting;
the open tube end being positioned adjacent to the annular setting;
the closed tube end being positioned offset from the annular setting; and
the marker-retaining tube being attached against the annular setting by the snap connector.

7. The woodworking circle-drawing tool as claimed in claim 6 comprising:
the marker holder further comprising a holder handle;
the holder handle being externally positioned to the marker-retaining tube; and
the holder handle being connected to the closed tube end.

8. The woodworking circle-drawing tool as claimed in claim 6 comprising:

the snap connector comprising a tubular jacket, a snap hook, and a hook receiver;

the tubular jacket being laterally mounted around the marker-retaining tube;

the snap hook being hingedly connected to the tubular jacket, adjacent to the open tube end;

the hook receiver being positioned adjacent to the annular setting;

the hook receiver being integrated into the holder clamp; and the snap hook being engaged into the hook receiver.

9. The woodworking circle-drawing tool as claimed in claim 1 comprising:

the holder clamp comprising a clamp sleeve, a sleeve hole, an oblong hole, and a clamp fastener;

the clamp sleeve being slidably mounted around the support bar;

the oblong hole laterally traversing into the support bar;

the sleeve hole laterally traversing into the clamp sleeve; and the clamp fastener being engaged through the sleeve hole and the oblong hole.

10. The woodworking circle-drawing tool as claimed in claim 1 comprising:

the small-target stencil comprising a stencil setting, a stencil arm, and a stencil body;

the stencil setting being terminally mounted to the second bar end;

the stencil arm being positioned orthogonal to the support bar and a rotation axis of the releasable anchor;

the stencil arm being laterally connected to the stencil setting;

the stencil body being laterally positioned to the stencil arm; and the stencil body being hingedly connected to the stencil arm.

11. A woodworking circle-drawing tool comprising:

a support bar;

a releasable anchor;

a marker holder;

a holder clamp;

a small-target stencil;

the support bar comprising a U-shaped bar body, a plurality of bar holes, a first bar end, and a second bar end;

the U-shaped bar body comprising a central web, a first leg, and a second leg;

the first leg being positioned parallel and offset to the second leg;

the first leg and the second leg being positioned perpendicular to the central web;

the first leg being connected adjacent and along the central web;

the second leg being connected adjacent and along the central web, opposite to the first leg;

the plurality of bar holes being distributed along the central web;

each of the plurality of bar holes traversing through the central web;

the releasable anchor being slidably mounted along the U-shaped bar body;

the small-target stencil being mounted onto the second bar end;

the marker holder being laterally attached to the U-shaped bar body by the holder clamp;

the marker holder being positioned in between the releasable anchor and the small-target stencil; and the releasable anchor being engaged with a selected bar hole from the plurality of bar holes.

12. The woodworking circle-drawing tool as claimed in claim 11 comprising:

the releasable anchor comprising a bar carriage, a fastener guide, and a bar connector;

the bar carriage comprising a carriage sleeve, a carriage leg, a carriage arm, and an extension wall;

the bar connector comprising a release arm and a spring-loaded pin;

the extension wall being connected perpendicular and along the carriage leg;

the carriage sleeve being terminally connected to the carriage leg and the extension wall;

the carriage sleeve being slidably mounted around the U-shaped bar body;

the carriage arm being positioned perpendicular to the carriage sleeve;

the carriage sleeve being terminally connected to the carriage arm;

the fastener guide being laterally positioned to the carriage arm;

the fastener guide being hingedly connected to the carriage arm;

the spring-loaded pin being terminally connected to the carriage leg, opposite to the carriage sleeve;

the spring-loaded pin being laterally positioned into the U-shaped bar body;

the spring-loaded pin being engaged with the selected bar hole;

the release arm being terminally connected to the extension wall, opposite to the carriage sleeve; and the release arm and the carriage leg being positioned opposite to each other across extension wall.

13. The woodworking circle-drawing tool as claimed in claim 12 comprising:

the fastener guide comprising a guide body, a cylindrical cavity, a fastener-bracing washer, a compression spring, a base hole, an anchoring pivot, and an annular cap;

the anchoring pivot comprising a pivot body, a stabilizing plate, a fastener hole;

the cylindrical cavity traversing into the guide body;

the base hole traversing through the guide body from the cylindrical cavity;

the compression spring, the fastener-bracing washer, and the stabilizing plate being positioned within the cylindrical cavity;

the stabilizing plate being positioned adjacent to the base hole;

the compression spring being positioned in between the stabilizing plate and the fastener-bracing washer;

the pivot body being externally positioned to the guide body, adjacent to the base hole;

the pivot body being torsionally connected to the stabilizing plate through the base hole;

the fastener hole traversing through the stabilizing plate and the pivot body;

the fastener hole, the compression spring, and the fastener-bracing washer being coaxially aligned with each other along a rotation axis of the releasable anchor;

the annular cap being positioned across an opening of the cylindrical cavity; and the annular cap being attached onto the guide body.

14. The woodworking circle-drawing tool as claimed in claim 11 comprising:

the marker holder comprising a marker-retaining tube, an annular setting, a snap connector, and holder handle;

the marker-retaining tube comprising an open tube end and a closed tube end;

the snap connector comprising a tubular jacket, a snap hook, and a hook receiver;

the snap connector and the annular setting being laterally connected to the holder clamp;

a central axis of the annular setting being positioned parallel to a rotation axis of the releasable anchor;

the marker-retaining tube being coaxially aligned with the annular setting;

the open tube end being positioned adjacent to the annular setting;

the closed tube end being positioned offset from the annular setting;

the holder handle being externally positioned to the marker-retaining tube;

the holder handle being connected to the closed tube end;

the tubular jacket being laterally mounted around the marker-retaining tube;

the snap hook being hingedly connected to the tubular jacket, adjacent to the open tube end;

the hook receiver being positioned adjacent to the annular setting;

the hook receiver being integrated into the holder clamp; and the snap hook being engaged into the hook receiver.

15. The woodworking circle-drawing tool as claimed in claim 11 comprising:

the holder clamp comprising a clamp sleeve, a sleeve hole, an oblong hole, and a clamp fastener;

the clamp sleeve being slidably mounted around the support bar;

the oblong hole laterally traversing into the support bar;

the sleeve hole laterally traversing into the clamp sleeve; and the clamp fastener being engaged through the sleeve hole and the oblong hole.

16. The woodworking circle-drawing tool as claimed in claim 11 comprising:

the small-target stencil comprising a stencil setting, a stencil arm, and a stencil body;

the stencil setting being terminally mounted to the second bar end;

the stencil arm being positioned orthogonal to the support bar and a rotation axis of the releasable anchor;

the stencil arm being laterally connected to the stencil setting;

the stencil body being laterally positioned to the stencil arm; and the stencil body being hingedly connected to the stencil arm.

17. A woodworking circle-drawing tool comprising:

a support bar;

a releasable anchor;

a marker holder;

a holder clamp;

a small-target stencil;

the support bar comprising a U-shaped bar body, a plurality of bar holes, a first bar end, and a second bar end;

the U-shaped bar body comprising a central web, a first leg, and a second leg;

the first leg being positioned parallel and offset to the second leg;

the first leg and the second leg being positioned perpendicular to the central web;

the first leg being connected adjacent and along the central web;

the second leg being connected adjacent and along the central web, opposite to the first leg;

the plurality of bar holes being distributed along the central web;

each of the plurality of bar holes traversing through the central web;

the releasable anchor being slidably mounted along the U-shaped bar body;

the small-target stencil being mounted onto the second bar end;

the marker holder being laterally attached to the U-shaped bar body by the holder clamp;

the marker holder being positioned in between the releasable anchor and the small-target stencil; and the releasable anchor being engaged with a selected bar hole from the plurality of bar holes.

18. The woodworking circle-drawing tool as claimed in claim 17 comprising:

the releasable anchor comprising a bar carriage, a fastener guide, and a bar connector;

the bar carriage comprising a carriage sleeve, a carriage leg, a carriage arm, and an extension wall;

the bar connector comprising a release arm and a spring-loaded pin;

the fastener guide comprising a guide body, a cylindrical cavity, a fastener-bracing washer, a compression spring, a base hole, an anchoring pivot, and an annular cap;

the anchoring pivot comprising a pivot body, a stabilizing plate, a fastener hole;

the extension wall being connected perpendicular and along the carriage leg;

the carriage sleeve being terminally connected to the carriage leg and the extension wall;

the carriage sleeve being slidably mounted around the U-shaped bar body;

the carriage arm being positioned perpendicular to the carriage sleeve;

the carriage sleeve being terminally connected to the carriage arm;

the fastener guide being laterally positioned to the carriage arm;

the fastener guide being hingedly connected to the carriage arm;

the spring-loaded pin being terminally connected to the carriage leg, opposite to the carriage sleeve;

the spring-loaded pin being laterally positioned into the U-shaped bar body;

the spring-loaded pin being engaged with the selected bar hole;

the release arm being terminally connected to the extension wall, opposite to the carriage sleeve;

the release arm and the carriage leg being positioned opposite to each other across extension wall;

the cylindrical cavity traversing into the guide body;

the base hole traversing through the guide body from the cylindrical cavity;

the compression spring, the fastener-bracing washer, and the stabilizing plate being positioned within the cylindrical cavity;

the stabilizing plate being positioned adjacent to the base hole;

the compression spring being positioned in between the stabilizing plate and the fastener-bracing washer;

the pivot body being externally positioned to the guide body, adjacent to the base hole;

the pivot body being torsionally connected to the stabilizing plate through the base hole;

the fastener hole traversing through the stabilizing plate and the pivot body;

the fastener hole, the compression spring, and the fastener-bracing washer being coaxially aligned with each other along a rotation axis of the releasable anchor;

the annular cap being positioned across an opening of the cylindrical cavity; and the annular cap being attached onto the guide body.

19. The woodworking circle-drawing tool as claimed in claim 17 comprising:

the marker holder comprising a marker-retaining tube, an annular setting, a snap connector, and holder handle;

the marker-retaining tube comprising an open tube end and a closed tube end;

the snap connector comprising a tubular jacket, a snap hook, and a hook receiver;

the snap connector and the annular setting being laterally connected to the holder clamp;

a central axis of the annular setting being positioned parallel to a rotation axis of the releasable anchor;

the marker-retaining tube being coaxially aligned with the annular setting;

the open tube end being positioned adjacent to the annular setting;

the closed tube end being positioned offset from the annular setting;

the holder handle being externally positioned to the marker-retaining tube;

the holder handle being connected to the closed tube end;

the tubular jacket being laterally mounted around the marker-retaining tube;

the snap hook being hingedly connected to the tubular jacket, adjacent to the open tube end;

the hook receiver being positioned adjacent to the annular setting;

the hook receiver being integrated into the holder clamp; and the snap hook being engaged into the hook receiver.

20. The woodworking circle-drawing tool as claimed in claim 17 comprising:

the holder clamp comprising a clamp sleeve, a sleeve hole, an oblong hole, and a clamp fastener;

the small-target stencil comprising a stencil setting, a stencil arm, and a stencil body;

the clamp sleeve being slidably mounted around the support bar;

the oblong hole laterally traversing into the support bar;

the sleeve hole laterally traversing into the clamp sleeve;

the clamp fastener being engaged through the sleeve hole and the oblong hole;

the stencil setting being terminally mounted to the second bar end;

the stencil arm being positioned orthogonal to the support bar and a rotation axis of the releasable anchor;

the stencil arm being laterally connected to the stencil setting;

the stencil body being laterally positioned to the stencil arm; and the stencil body being hingedly connected to the stencil arm.

* * * * *